(12) United States Patent
Pittens et al.

(10) Patent No.: US 9,429,172 B2
(45) Date of Patent: Aug. 30, 2016

(54) TELESCOPIC POSITION ADJUSTMENT MECHANISM

(71) Applicant: Nine Point Eight Inc., Ancaster (CA)

(72) Inventors: Jacobus Josef Pittens, Cambridge (CA); Phillip Samuel Schilling, Guelph (CA); Bradley James Woodward, Hamilton (CA); Daniel Christopher Gray, St. George (CA); John Duffett, Hamilton (CA)

(73) Assignee: Nine Point Eight Inc. (CA)

( * ) Notice: Subject to any disclaimer, the term of this patent is extended or adjusted under 35 U.S.C. 154(b) by 922 days.

(21) Appl. No.: 13/725,194

(22) Filed: Dec. 21, 2012

(65) Prior Publication Data

US 2014/0174286 A1   Jun. 26, 2014

(51) Int. Cl.
*B62J 1/08* (2006.01)
*F15B 1/26* (2006.01)
*B62K 19/36* (2006.01)

(52) U.S. Cl.
CPC .. *F15B 1/26* (2013.01); *B62J 1/08* (2013.01); *B62K 19/36* (2013.01); *B62J 2001/085* (2013.01)

(58) Field of Classification Search
CPC ..... B62J 2001/085; B62J 1/08; B62K 19/36; B62K 2025/045; F15B 1/26
USPC .................................................... 297/215.13
See application file for complete search history.

(56) References Cited

U.S. PATENT DOCUMENTS

| | | | |
|---|---|---|---|
| 4,807,856 A | 2/1989 | Teckenbrock | |
| 5,346,235 A | 9/1994 | Holman | |
| 6,050,585 A | 4/2000 | Rai | |
| 6,202,971 B1 | 3/2001 | Duncan | |
| 6,220,581 B1 | 4/2001 | Mueller | |
| 6,354,557 B1 | 3/2002 | Walsh | |
| 6,478,278 B1 | 11/2002 | Duncan | |
| 6,585,215 B2 | 7/2003 | Duncan | |
| 7,025,367 B2 * | 4/2006 | McKinnon | B62K 19/36 267/132 |
| 7,025,522 B2 | 4/2006 | Sicz et al. | |
| 7,083,180 B2 | 8/2006 | Turner | |
| 7,422,224 B2 | 9/2008 | Sicz et al. | |
| 7,673,936 B2 | 3/2010 | Hsu | |
| 7,708,251 B2 * | 5/2010 | Watt | A63B 22/0046 248/407 |
| 7,909,348 B2 | 3/2011 | Klieber | |
| 8,016,349 B2 | 9/2011 | Mouri et al. | |
| 8,038,208 B2 | 10/2011 | Mankadi | |
| 8,177,251 B2 * | 5/2012 | Shirai | B62J 1/08 280/288.4 |

(Continued)

*Primary Examiner* — Nathaniel Wiehe
*Assistant Examiner* — Abiy Teka
(74) *Attorney, Agent, or Firm* — Steven M. Greenberg; CRGO Law

(57) ABSTRACT

A telescopic position adjustment mechanism allows for a telescoping element to be indexed by fixed increments toward a more telescopically collapsed position, relative to its base. The telescopic position adjustment mechanism uses a stepping reservoir that can, in a stepping configuration, selectively receive a predetermined volume of fluid from a support reservoir that supports the telescoping element against the base, enabling the telescoping element to collapse toward the base by a distance corresponding to the predetermined volume of fluid. In a locking configuration, the volume of fluid in the support reservoir is constant and the telescopic position is fixed, and in a free movement configuration fluid can flow freely between the support reservoir and a sink reservoir to permit free telescopic movement. A rotation resistance mechanism uses a locking key that is biased into engagement with a locking channel to inhibit rotation of the telescoping element relative to the base.

19 Claims, 19 Drawing Sheets

(56) References Cited

U.S. PATENT DOCUMENTS

| | | | | |
|---|---|---|---|---|
| 8,317,261 B2* | 11/2012 | Walsh | ........................ | B62J 1/10 |
| | | | | 297/215.13 |
| 8,328,454 B2* | 12/2012 | McAndrews | .............. | B62J 1/08 |
| | | | | 297/215.13 |
| 2002/0185581 A1 | 12/2002 | Trask | | |
| 2004/0070168 A1 | 4/2004 | McKinnon | | |
| 2006/0175792 A1* | 8/2006 | Sicz | ........................... | B62J 1/06 |
| | | | | 280/200 |
| 2009/0324327 A1 | 12/2009 | McAndrews et al. | | |
| 2010/0052286 A1 | 3/2010 | Maier | | |
| 2010/0187870 A1 | 7/2010 | Mackenroth | | |
| 2010/0308628 A1 | 12/2010 | Hsu | | |
| 2011/0187166 A1 | 8/2011 | Walsh | | |
| 2012/0006949 A1 | 1/2012 | Laird et al. | | |

* cited by examiner

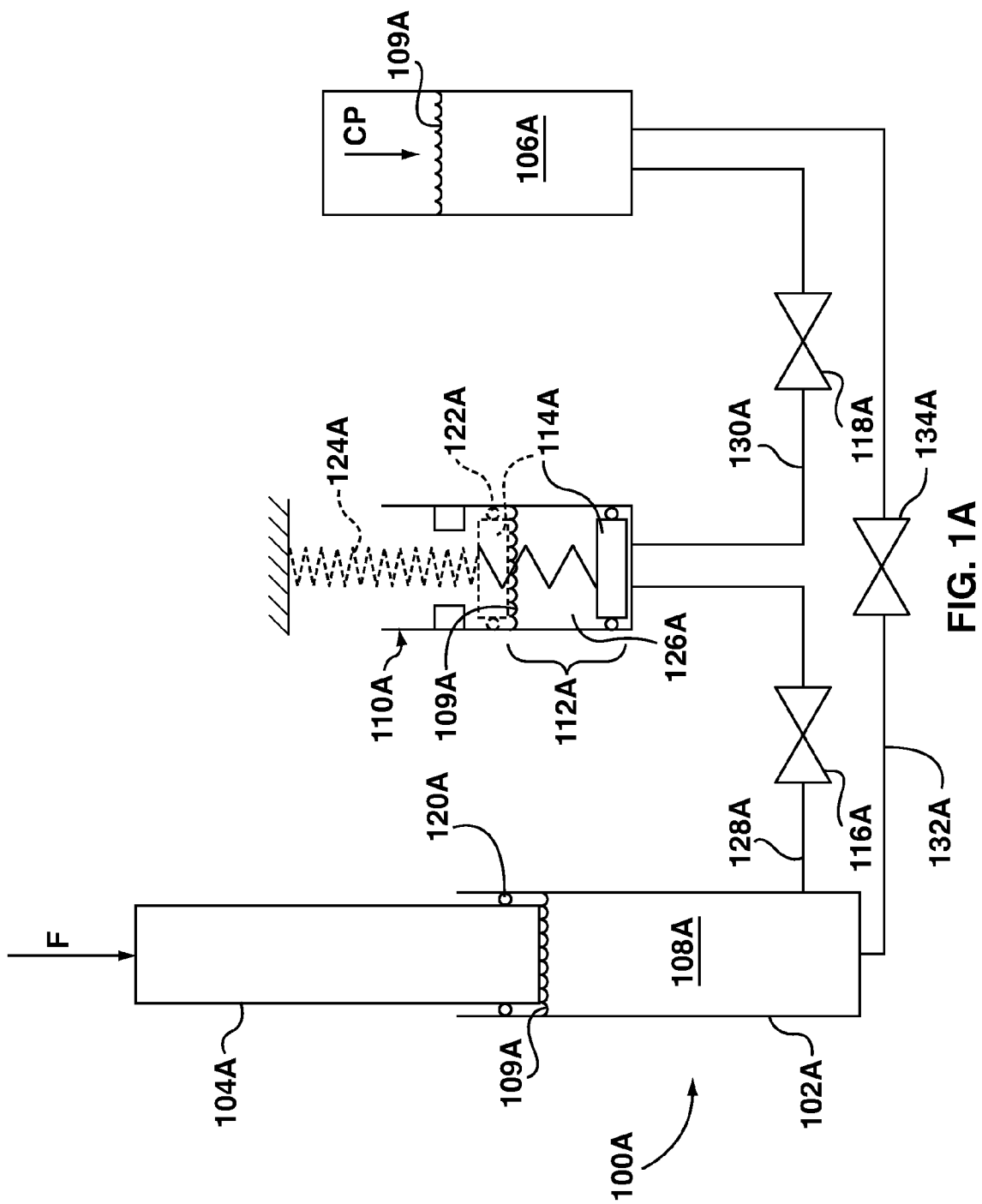

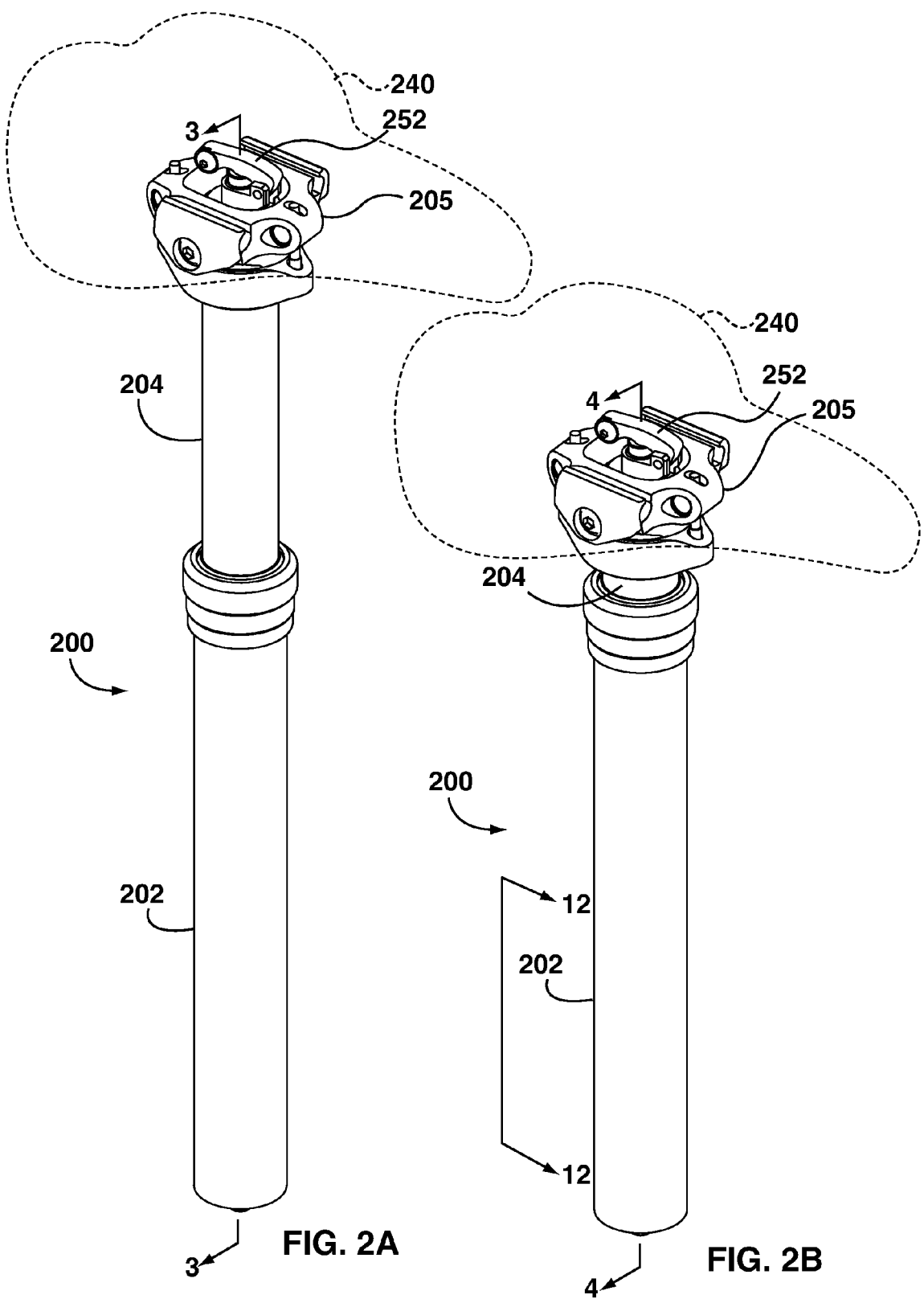

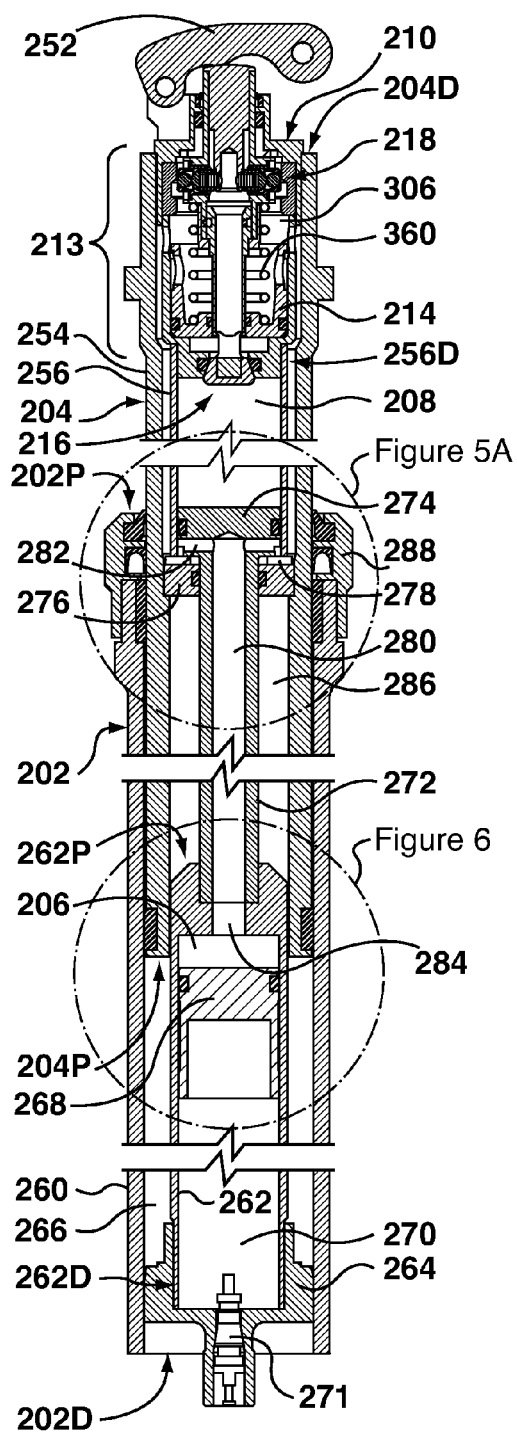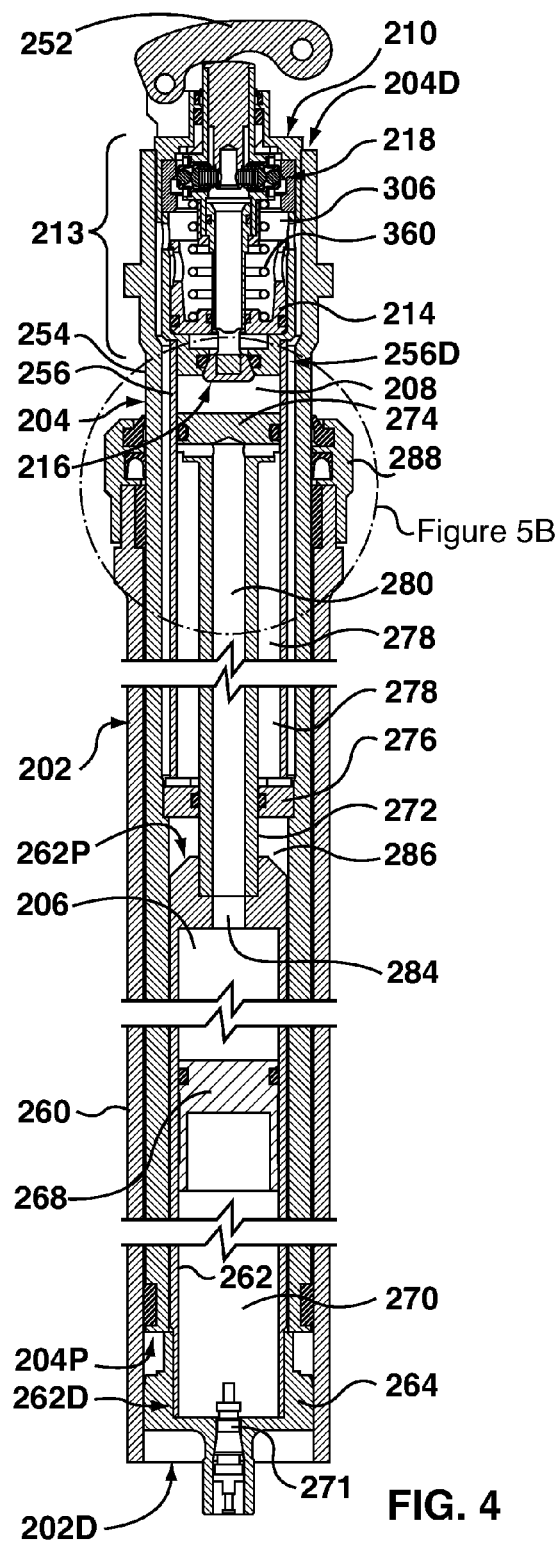
FIG. 3
FIG. 4

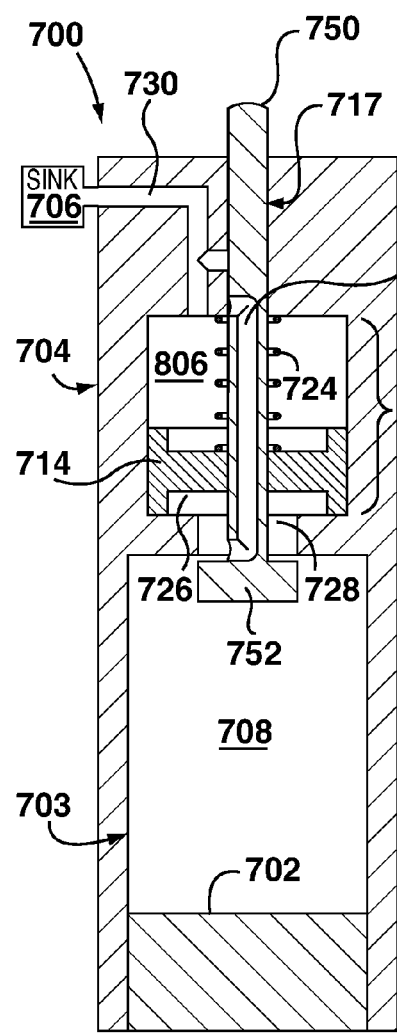
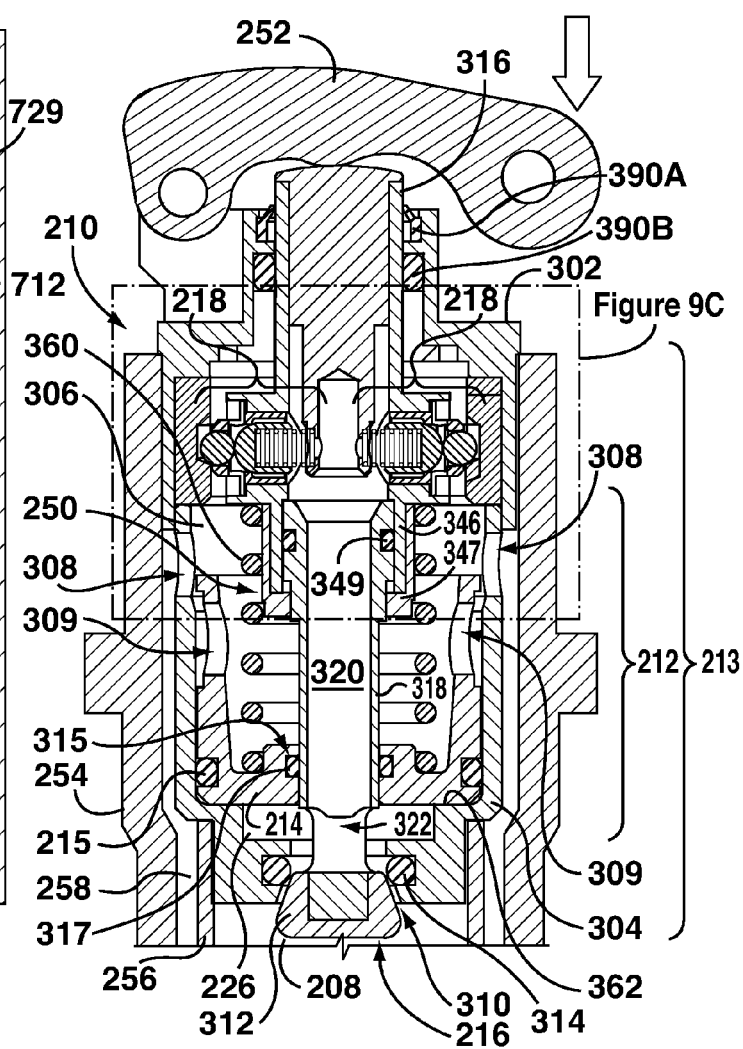
FIG. 9A
FIG. 9B

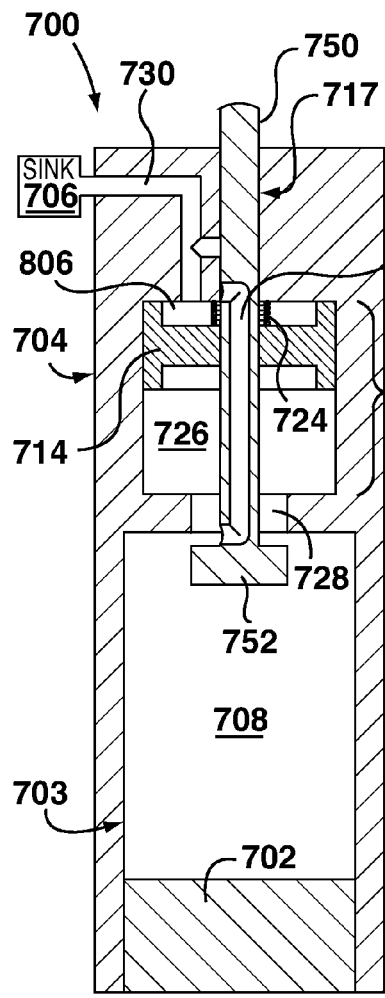
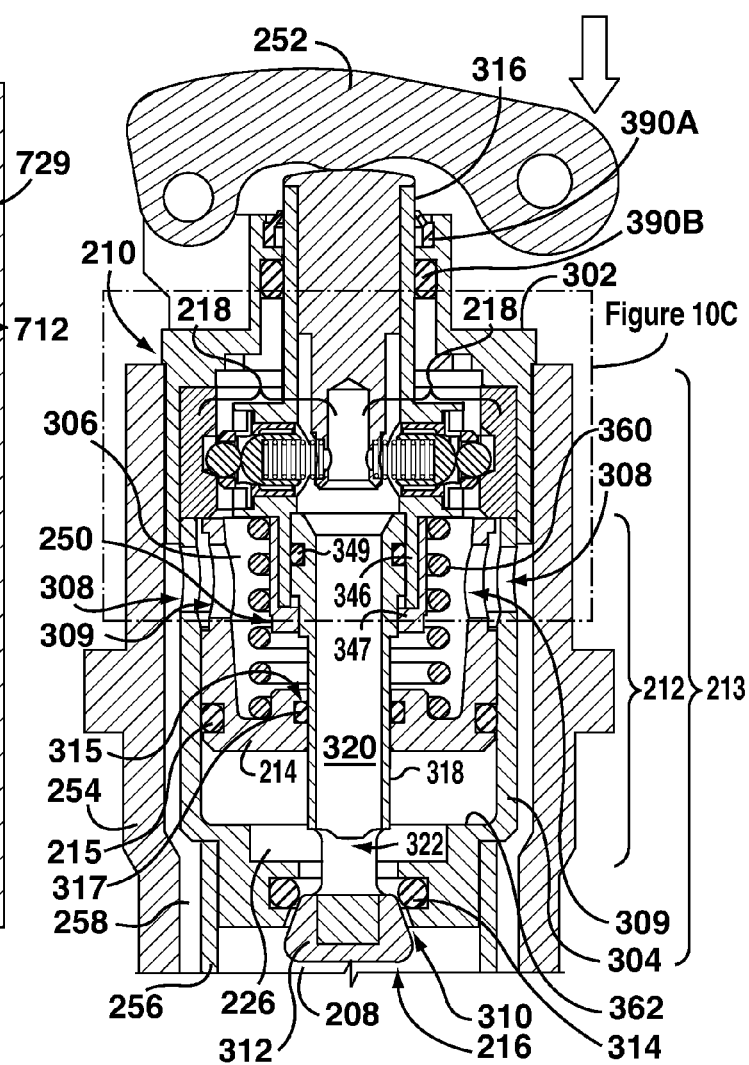
FIG. 10A
FIG. 10B

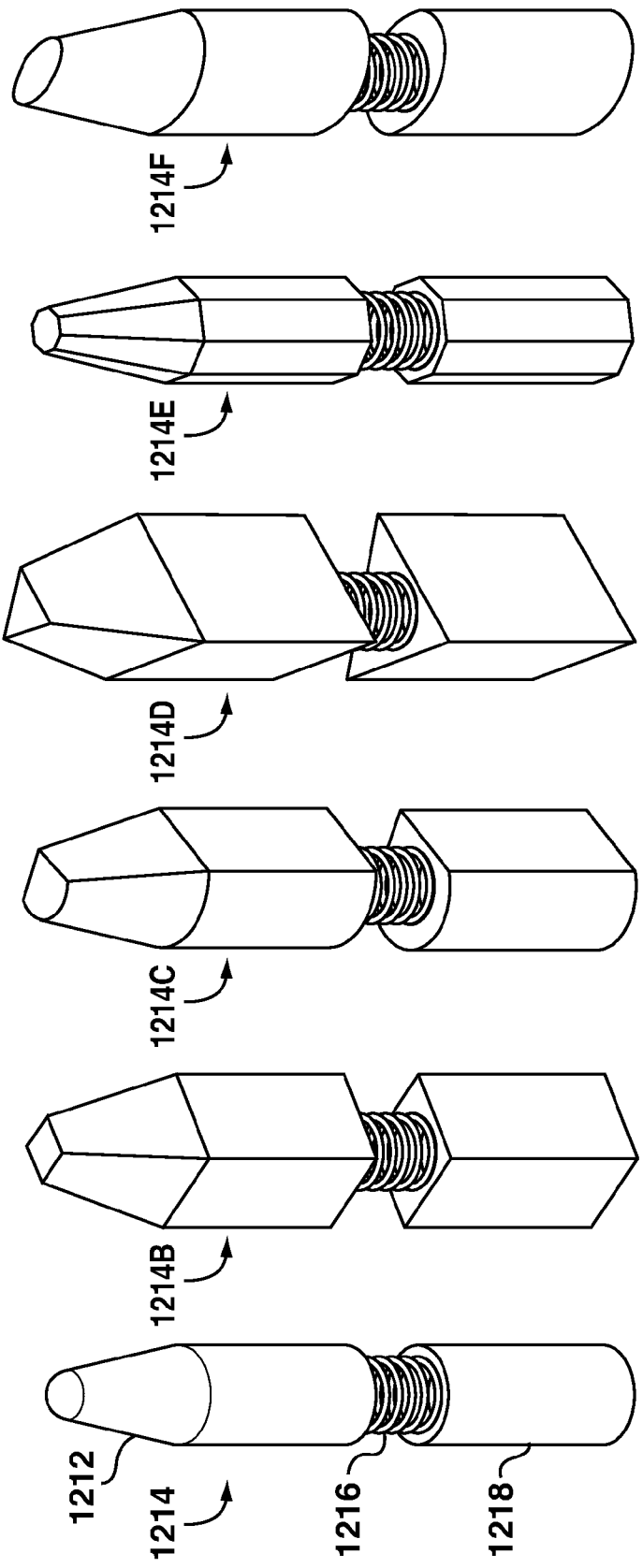

TELESCOPIC POSITION ADJUSTMENT MECHANISM

TECHNICAL FIELD

The present disclosure relates to telescoping systems, and in particular to mechanisms for adjusting the telescopic position of a telescoping element relative to a base as well as for inhibiting rotation of a telescoping element relative to a base.

BACKGROUND

Telescopic position adjustment mechanisms for adjusting the telescopic position of a telescoping element relative to a base and maintaining the telescoping element in the selected position are well known.

One type of telescopic position adjustment mechanism relies on a support reservoir disposed between the telescoping element and the base for supporting the telescoping element against the base. In this type of telescopic position adjustment mechanism, the telescoping element is slidably received within the base or vice versa, and the support reservoir is in valve-governed fluid communication with a sink reservoir, each of which contains an incompressible fluid. By opening the valve, the position of the telescoping element relative to the base can be adjusted. Moving fluid from the support reservoir to the sink reservoir will telescopically collapse the telescoping element, and moving fluid from the sink reservoir to the support reservoir will telescopically extend the telescoping element. This type of telescopic position adjustment mechanism is often used as an adjustable seat post for a bicycle seat.

One problem with the above-mentioned telescopic position adjustment mechanism is that the position adjustment is imprecise. For example, if the above-mentioned telescopic position adjustment mechanism is used to support a bicycle seat, a rider who wishes to lower the seat only slightly from its current position may open the valve between the support reservoir and the sink reservoir for too long. If the rider is applying his or her weight to the seat, this can cause the seat to collapse beneath the rider, which is inconvenient.

Another difficulty with the above-mentioned telescopic position adjustment mechanism is rotation of the telescoping element relative to the base. Although there are a number of rotation resistance mechanisms, such as tongue and groove arrangements and using polygonal rather than cylindrical shapes for the telescoping element and base, because the telescoping element is slidably received within the base or vice versa, there must be sufficient play between the telescoping element and the base to enable one to slide freely relative to the other and prevent frictional jamming. Moreover, this play increases as the rotation resistance mechanisms become worn with use. The play between the telescoping element and the base has the undesired consequence of permitting rotation of the telescoping element relative to the base. Even if angularly small, such rotation can become a noticeable and discomfiting "wobble" when the above-mentioned telescopic position adjustment mechanism is used to support a bicycle seat.

SUMMARY

A telescopic position adjustment mechanism allows for a telescoping element to be indexed by fixed increments toward a more telescopically collapsed position, relative to its base. The telescopic position adjustment mechanism uses a stepping reservoir that can, when the mechanism is in a stepping configuration, selectively receive a predetermined volume of fluid from a support reservoir that supports the telescoping element against the base, enabling the telescoping element to collapse toward the base by a distance corresponding to the predetermined volume of fluid. The telescopic position adjustment mechanism also has a locking configuration in which the volume of fluid in the support reservoir is constant and in which fluid received in the stepping reservoir during a stepping stage can escape to a sink reservoir, and in which and the telescopic position of the telescoping element relative to the base is fixed. The telescopic position adjustment mechanism also preferably has a free movement configuration in which fluid can flow freely between the support reservoir and the sink reservoir to permit free telescopic movement in either direction. In one embodiment, a rotation resistance mechanism uses a locking key that is biased into engagement with a locking channel to inhibit rotation of the telescoping element relative to the base while permitting the telescoping element to telescope relative to the base.

A telescopic position adjustment mechanism, comprises a base, a telescoping element slidingly telescopically received by the base, a sink reservoir, and a support reservoir defined between the base and the telescoping element and supporting the telescoping element against the base. The support reservoir has a variable volume according to a position of the telescoping element relative to the base. The telescopic position adjustment mechanism further comprises a housing defining a stepping chamber, and a stepping piston is slidingly sealingly received in the stepping chamber and reciprocable within the stepping chamber between a stepped position and an unstepped position. The stepping piston is biased toward the unstepped position and cooperates with the stepping chamber to define a variable-volume stepping reservoir whose maximum volume is defined by the stepped position of the stepping piston and whose minimum volume is defined by the unstepped position of the stepping piston. The support reservoir is in valve-governed fluid communication with the sink reservoir and in valve-governed fluid communication with the stepping reservoir, which is in valve-governed fluid communication with the sink reservoir. The telescopic position adjustment mechanism further comprises at least one valve governing fluid communication between the stepping reservoir and the sink reservoir and between the stepping reservoir and the support reservoir. The at least one valve has a locking configuration and a stepping configuration. In the locking configuration, fluid communication between the support reservoir and the stepping reservoir is obstructed, fluid communication between the support reservoir and the sink reservoir is obstructed, and fluid communication between the stepping reservoir and the sink reservoir is permitted. In the stepping configuration, fluid communication between the support reservoir and the stepping reservoir is permitted, fluid communication between the support reservoir and the sink reservoir is obstructed, and fluid communication between the stepping reservoir and the sink reservoir is obstructed. The telescopic position adjustment mechanism further comprises at least one valve actuator coupled to the at least one valve for selectively driving the at least one valve into one of the locking configuration and the stepping configuration.

Preferably, when the at least one valve actuator drives the at least one valve from the locking configuration to the stepping configuration, fluid communication between the stepping reservoir and the sink reservoir is obstructed before fluid communication between the support reservoir and the stepping reservoir is permitted.

The telescopic position adjustment mechanism also preferably has a free movement configuration in which fluid communication between the support reservoir and the sink reservoir is permitted, with the at least one valve actuator being coupled to the at least one valve for selectively driving the at least one valve into the free movement configuration.

In one preferred embodiment, the at least one valve actuator comprises a single valve actuator driving the at least one valve. In one implementation, the valve actuator is slidably received in the housing and is slidably movable relative to the housing to reciprocate through a stepping position between a locking position and a free movement position and moves independently of the stepping piston. The valve actuator drives the at least one valve to reciprocate through the stepping configuration between the locking configuration and the free movement configuration. Thus, when the valve actuator is in the locking position the at least one valve is in the locking configuration, when the valve actuator is in the stepping position the at least one valve is in the stepping configuration, and when the valve actuator is in the free movement position the at least one valve is in the free movement configuration.

In one preferred embodiment, the at least one valve comprises at least one stepping valve interposed in a fluid path between the stepping reservoir and the sink reservoir to govern fluid communication therebetween and at least one support valve interposed in a fluid path between the support reservoir and the stepping reservoir to govern fluid communication therebetween. In such an embodiment, when the at least one valve is in the locking configuration, the at least one support valve is closed, when the at least one valve is in the stepping configuration, the at least one support valve is open and the at least one stepping valve is closed, and when the at least one valve is in the free movement configuration, the at least one support valve is open and the at least one stepping valve is open.

In one preferred embodiment, the stepping piston cooperates with the stepping chamber to define a variable-volume intermediate reservoir opposite the stepping reservoir, and the stepping piston divides the stepping chamber into the stepping reservoir and the intermediate reservoir. The maximum volume of the intermediate reservoir is defined by the unstepped position of the stepping piston and the minimum volume of the intermediate reservoir is defined by the stepped position of the stepping piston. The intermediate reservoir is in fluid communication with the sink reservoir, the stepping reservoir is in valve-governed fluid communication with the sink reservoir through the intermediate reservoir, and the at least one stepping valve is interposed in a fluid path between the stepping reservoir and the intermediate reservoir to govern fluid communication therebetween.

In one preferred embodiment, the at least one valve actuator comprises a single valve actuator that is slidably received in the housing. The valve actuator is slidably movable relative to the housing to reciprocate through a stepping position between a locking position and a free movement position, and the valve actuator moves independently of the stepping piston. When the valve actuator is in the locking position, the at least one support valve is closed, when the valve actuator is in the stepping position, the at least one support valve is open and the at least one stepping valve is closed, and when the valve actuator is in the free movement position, the at least one support valve is open and the at least one stepping valve is open. Preferably, when the valve actuator moves from the locking position to the stepping position, the valve actuator drives the stepping valve closed before driving the support valve open.

In a particularly preferred embodiment, the valve actuator comprises a stepping valve actuator portion and a support valve actuator portion, with the support valve actuator portion slidingly telescopically received by the stepping valve actuator portion. In this embodiment, movement of the valve actuator from the locking position to the stepping position comprises a stepping valve driving stage followed by a support valve driving stage. In the stepping valve driving stage, the stepping valve actuator portion slides relative to the housing while also sliding telescopically along the support valve actuator portion to drive the at least one stepping valve open while the support valve actuator portion remains static relative to the housing and the support valve remains closed. In the support valve driving stage, the stepping valve actuator portion slides relative to the housing and moves the support valve actuator portion linearly relative to the housing to drive the at least one support valve open.

In one preferred embodiment, the at least one support valve comprises a support valve aperture in the housing between the support reservoir and the stepping reservoir and a support valve valving element carried by the support valve actuator portion for movement into and out of sealing engagement with the support valve aperture.

In one preferred embodiment, the stepping reservoir is in valve-governed fluid communication with the intermediate reservoir through an actuator fluid conduit defined in the valve actuator, and the at least one stepping valve is interposed between the actuator fluid conduit and the intermediate reservoir. In a particularly preferred embodiment, each stepping valve comprises a stepping valve passage, a stepping valve valving element, at least one biasing member, a cam surface and a ball. The stepping valve passage is defined in the stepping valve actuator portion to connect the actuator fluid conduit in fluid communication with the intermediate reservoir, and has an inwardly projecting annular shoulder. The stepping valve valving element is carried by the stepping valve actuator portion, has a tapered end and is movable relative to the stepping valve passage for movement of the tapered end into and out of sealing engagement with the annular shoulder. The at least one biasing member acts between the stepping valve actuator portion and the stepping valve valving element to bias the stepping valve valving element into engagement with the annular shoulder. The cam surface is on an interior surface of the housing opposite the stepping valve passage, and comprises a first cam surface portion, a second cam surface portion and a ball receptacle defined between the first cam surface portion and the second cam surface portion. The first cam surface portion and the second cam surface portion each extend further inwardly than the ball receptacle so that the ball receptacle forms a trough between the first cam surface portion and the second cam surface portion, and the cam surface tapers outwardly from the first cam surface portion toward the ball receptacle and tapers inwardly from the ball receptacle to the second cam surface portion. The ball is captured between the cam surface and the tapered end of the stepping valve valving element, and is carried along the cam surface by the stepping valve actuator portion during movement thereof. When the valve actuator is in the locking position, the first cam surface portion forces the ball against the tapered end of the stepping valve valving element to disengage the tapered end of the stepping valve valving element from the annular shoulder and permit fluid flow past the annular shoulder. When the valve actuator is in the stepping position, the ball rests in the ball receptacle and the tapered end of the stepping valve valving element is in sealing engagement with the annular shoulder. When the valve actuator is in the free movement position, the second cam surface portion forces the ball against the tapered end of the stepping valve valving element to disengage the tapered end of the stepping valve valving element from the annular shoulder and permit fluid flow past the annular shoulder.

In one preferred embodiment, the housing is received in a distal end of the telescoping element, relative to the base, and the telescoping element comprises a main telescoping tube and a spacer tube disposed inside the main telescoping tube. The spacer tube is fixedly carried by the housing and extends from the housing along a portion of the main telescoping tube toward a proximal end of the telescoping element. The exterior surface of the spacer tube is spaced from the interior surface of the main telescoping tube to define an annular space between the spacer tube and the main telescoping tube, and the intermediate reservoir is in fluid communication with this annular space. The spacer tube has a distal end, relative to the base, that is sealed to the housing. The base comprises an outer base tube and an inner base tube disposed inside the outer base tube, and the inner base tube is rigidly coupled to the outer base tube and extends along a portion of the outer base tube toward a proximal end of the base, relative to the telescoping element. The exterior surface of the inner base tube is spaced from the interior surface of the outer base tube to define an annular space between the inner base tube and the outer base tube, and the main telescoping tube is received in the annular space between the inner base tube and the outer base tube. The inner base tube has closed proximal and distal ends, relative to the telescoping element, and a floating piston is slidingly sealingly received in the inner base tube. The floating piston divides the interior volume of the inner base tube into the sink reservoir, disposed between the floating piston and the closed proximal end of the inner base tube, and a counterpressure chamber disposed between the floating piston and the closed distal end of the inner base tube. The sink reservoir and the counterpressure chamber are each of variable volume according to the position of the floating piston. A fixed piston tube is in sealing engagement with the closed proximal end of the inner base tube and extends from the closed proximal end of the inner base tube toward the proximal end of the base, terminating at a fixed piston that is slidingly sealingly received in the spacer tube. The housing, spacer tube, and fixed piston cooperate to define the support reservoir. An annular guide is sealingly fixed inside the main telescoping tube so as to be positioned between the proximal end of the spacer tube and the closed proximal end of the inner base tube and the annular guide slidingly sealingly receives the fixed piston tube. The annular space between the spacer tube and the main telescoping tube is in fluid communication with the interior volume of the spacer tube between the annular guide and the fixed piston. A piston tube fluid conduit is defined in the fixed piston tube, the interior volume of the spacer tube between the annular guide and the fixed piston is in fluid communication with the piston tube fluid conduit, and the piston tube fluid conduit is in fluid communication with the sink reservoir through a sink aperture in the closed proximal end of the inner base tube.

The counterpressure chamber may be a counterpressure reservoir for containing compressible gas, and the telescopic position adjustment mechanism may further comprise a counterpressure valve in fluid communication with the counterpressure reservoir for introducing compressible gas into, and releasing compressible gas from, the counterpressure reservoir.

In one preferred embodiment, the telescopic position adjustment mechanism further comprises a driver pivotally carried by the telescoping element for driving the valve actuator from the locking position through the stepping position to the free movement position. In one particular embodiment, the telescopic position adjustment mechanism further comprises a saddle clamp carried by the telescoping element at a distal end thereof for removably receiving a bicycle saddle.

In one embodiment, a biasing member acts between the stepping valve actuator portion and the stepping piston to urge the stepping piston toward the unstepped position, and in the unstepped position the stepping piston engages a stop on the housing so that, when the stepping piston is in the unstepped position, the biasing member acts between the housing and the valve actuator to urge the valve actuator toward the locking position. In a particular embodiment, when the stepping piston is in the unstepped position, the biasing member acts between the housing and the stepping valve actuator portion and the stepping valve actuator portion carries the support valve actuator portion when the valve actuator moves to the locking position under urging from the biasing member.

A rotation-resistant telescoping arrangement comprises an outer tube, a telescoping element slidably received in the outer tube to telescope relative to the outer tube, and at least one locking key. One of the telescoping element and the outer tube has at least one channel extending parallel to a direction of telescoping movement of the telescoping element relative to the outer tube, and the other of the telescoping element and the outer tube has at least one receptacle, with each receptacle arranged in facing registration with a corresponding channel to form at least one receptacle-channel pair. Each receptacle includes a locking ramp tapering toward the corresponding channel, and each locking key is captured between a receptacle-channel pair. Each locking key has a shape complementary to the locking ramp and complementary to the channel of the receptacle-channel pair. For each receptacle-channel pair, a biasing member acts between the locking key and the other of the telescoping element and the outer tube to urge the locking key along the tapered locking ramp and into engagement with the channel, and the channel is longer than the locking key to permit telescopic travel of the telescoping element relative to the outer tube.

In one preferred embodiment, the locking ramp has a negative conical shape and the locking key is generally cylindrical and has a positive conical shape at a locking end thereof received by the locking ramp.

In one preferred embodiment, the locking key and the biasing member each form part of a locking pin captured in the receptacle-channel pair, and the locking pin further comprises a support member that engages a shoulder on the other of the telescoping element and the outer tube. The biasing member acts between the support member and the locking key to urge the locking key along the tapered locking ramp and into engagement with the channel.

In one particular embodiment, the at least one receptacle is formed in an outer surface of the telescoping element and the at least one channel is formed in an inner surface of the outer tube.

BRIEF DESCRIPTION OF THE DRAWINGS

These and other features will become more apparent from the following description in which reference is made to the appended drawings wherein:

FIG. 1A shows a schematic representation of a second exemplary telescopic position adjustment mechanism;

FIG. 2A is a top perspective view of an exemplary physical embodiment of a telescopic position adjustment mechanism showing the telescoping element thereof in a partially telescopically extended position relative to the base thereof;

FIG. 2B is a top perspective view of the telescopic position adjustment mechanism of FIG. 2A showing the telescoping element in a telescopically collapsed position relative to the base thereof;

FIG. 3 is a cross-sectional view of the telescopic position adjustment mechanism of FIG. 2A with the telescoping element thereof in a partially telescopically extended position relative to the base thereof, taken along the line 3-3 in FIG. 2A;

FIG. 4 is a cross-sectional view of the telescopic position adjustment mechanism of FIG. 2A with the telescoping element thereof in a telescopically collapsed position relative to the base thereof, taken along the line 4-4 in FIG. 2B;

FIG. 9A shows the simplified representation of a telescopic position adjustment mechanism of FIG. 7A, with the valve mechanism thereof in a stepping configuration and the stepping piston thereof in an unstepped position;

FIG. 9B is a detailed cross-sectional view of the valve mechanism of the telescopic position adjustment mechanism of FIG. 2A, showing the valve mechanism in a stepping configuration and the stepping piston thereof in an unstepped position;

FIG. 10A shows the simplified representation of a telescopic position adjustment mechanism of FIG. 7A, with the valve mechanism thereof in a stepping configuration and the stepping piston thereof in a stepped position;

FIG. 10B is a detailed cross-sectional view of the valve mechanism of the telescopic position adjustment mechanism of FIG. 2A, showing the valve mechanism in a stepping configuration and the stepping piston thereof in a stepped position;

DETAILED DESCRIPTION

Figure 1:
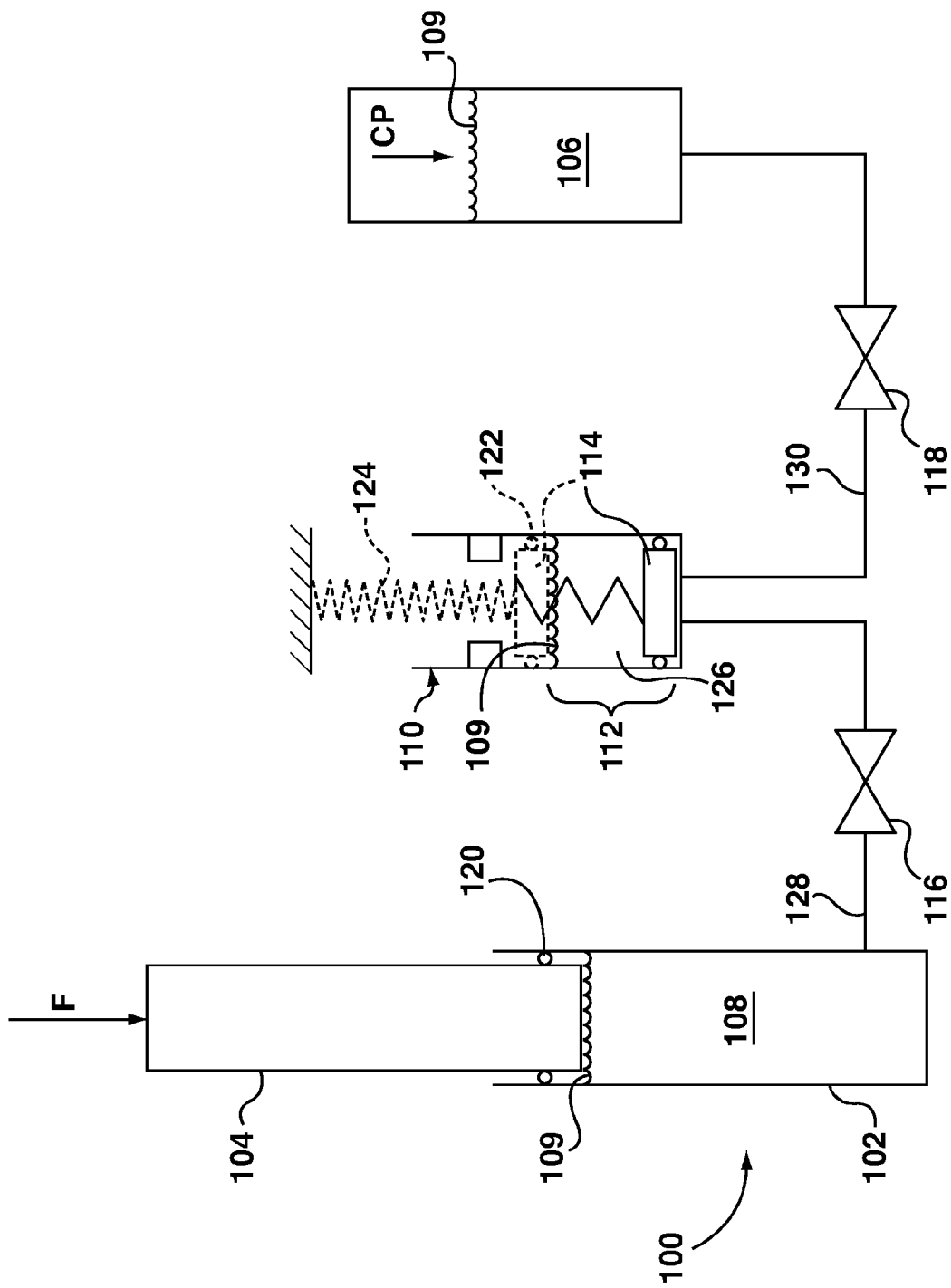
FIG. 1 shows a schematic representation of a first exemplary telescopic position adjustment mechanism.

Reference is now made to FIG. 1, which shows a schematic representation of a first exemplary telescopic position adjustment mechanism, indicated generally by reference numeral 100. The first exemplary telescopic position adjustment mechanism 100 shown in FIG. 1 comprises a base 102, a telescoping element 104, a sink reservoir 106, a support reservoir 108, a housing 110 defining a stepping chamber 112, a stepping piston 114, a support valve 116 and a stepping valve 118.

The telescoping element 104 is slidingly telescopically received by the base 102, and the support reservoir 108 is formed by the interior volume of the base 102 and defined between the base 102 and the telescoping element 104. As such, the support reservoir 108 has a variable volume according to the position of the telescoping element 104 relative to the base 102. A seal 120 between the exterior surface of the telescoping element 104 and the interior surface of the support reservoir 108 inhibits escape of fluid from the support reservoir 108. Although not limited to such an application, certain disclosed embodiments have particular utility in adjusting the height of a bicycle seat relative to a bicycle. Thus, a bicycle seat (not shown in FIG. 1) may be carried by the telescoping element 104, and all or part of the rider's weight may be applied to the telescoping element 104. Thus, an exemplary force F acting parallel to the telescoping direction and tending to urge the telescoping element 104 toward a telescopically collapsed configuration relative to the base 102 is shown in FIG. 1. This force F may be resisted by a volume of incompressible fluid 109 confined to the support reservoir 108 by the support valve 116, as described further below. The incompressible fluid in the support reservoir 108 supports the telescoping element 104 against the base 102 so as to maintain the telescoping element 104 in a telescopically fixed position relative to the base 102.

The stepping piston 114 is slidingly received in the stepping chamber 112, and is reciprocable within the stepping chamber 112 between a stepped position and an unstepped position. In FIG. 1, the unstepped position of the stepping piston 114 is shown in solid lines and the stepped position of the stepping piston 114 is shown with dashed lines. The stepping piston 114 cooperates with the stepping chamber 112 to define a variable-volume stepping reservoir 126 whose maximum volume is defined by the stepped position of the stepping piston 114 and whose minimum volume is defined by the unstepped position of the stepping piston 114. The stepping piston 114 is biased toward the unstepped position; in the exemplary embodiment 100 shown in FIG. 1 a spring 124 acts as a biasing member for this purpose. A seal 122 is disposed between the interior surface of the stepping chamber 112 and the exterior surface of the stepping piston 114 to inhibit fluid from flowing past the stepping piston 114.

The support reservoir 108 is in valve-governed fluid communication with the stepping reservoir 126, which is in valve-governed fluid communication with the sink reservoir 106. Therefore, in the exemplary embodiment shown in FIG. 1, the support reservoir 108 is also in valve-governed fluid communication with the sink reservoir 106 indirectly through the stepping reservoir 126. In particular, the support reservoir 108 is in valve-governed fluid communication with the stepping reservoir 126 via a first fluid conduit 128 in which the support valve 116 is interposed, and the stepping reservoir 126 is in valve-governed fluid communication with the sink reservoir 106 via a second fluid conduit 130 in which the stepping valve 118 is interposed. An incompressible fluid is contained in the telescopic position adjustment mechanism 100 and can, subject to the support valve 116 and stepping valve 118, flow between the support reservoir 108 and the stepping reservoir 126 via the first fluid conduit 128 and between the stepping reservoir 126 and the sink reservoir 106 via the second fluid conduit 130.

In the exemplary embodiment 100 shown in FIG. 1, when the support valve 116 is closed and the stepping valve 118 is open, the support valve 116 and the stepping valve 118 will collectively be in a locking configuration in which fluid communication between the support reservoir 108 and the stepping reservoir 126 is obstructed and fluid communication between the support reservoir 108 and the sink reservoir 106 is therefore also obstructed, with fluid communication between the stepping reservoir 126 and the sink reservoir 106 being permitted. With the support valve 116 and the stepping valve 118 in this locking configuration, the volume of fluid in the support reservoir 108 is fixed because the fluid is confined to the support reservoir 108 by the support valve 116. As such, the telescopic position of the telescoping element 104 relative to the base 102 will be fixed, since the telescoping element 104 is supported against the force F by the incompressible fluid in the support reservoir 108.

When the support valve 116 is open and the stepping valve 118 is closed, the support valve 116 and the stepping valve 118 will collectively be in a stepping configuration in which fluid communication between the support reservoir 108 and the stepping reservoir 126 is permitted and fluid communication between the stepping reservoir 126 and the sink reservoir 106 is obstructed. Since the support reservoir 108 communicates with the sink reservoir 106 through the stepping reservoir 126, fluid communication between the support reservoir 108 and the sink reservoir 106 is also obstructed when the support valve 116 and the stepping valve 118 are in the stepping communication. As will be explained in more detail below, the stepping configuration permits controlled, incremental collapse of the telescoping element 104 relative to the base 102.

As noted above, when the support valve 116 and the stepping valve 118 are in the locking configuration, the telescopic position of the telescoping element 104 relative to the base 102 will be fixed against the force F exerted against it. By moving the support valve 116 and the stepping valve 118 into the stepping configuration, the telescoping element 104 can be indexed by a fixed increment toward a telescopically collapsed configuration relative to the base 102. In particular, because in the stepping configuration the support valve 116 is open, fluid 109 can flow from the support reservoir 108 through the first fluid conduit 128 to the stepping reservoir 126 under the urging of the force F applied to the telescoping element 104. Although the stepping piston 114 is biased toward the unstepped position shown in solid lines, as long as the force F is sufficient to overcome the force exerted by the spring 124, fluid 109 will flow from the support reservoir 108 to the stepping chamber 112 and into the stepping reservoir 126, forcing the stepping piston from the unstepped position shown with solid lines to the stepped position shown in dashed lines. Because the stepping valve 118 is closed, the fluid 109 is confined to the stepping reservoir 126, and hence the amount of fluid 109 that can leave the support reservoir 108 is limited by the maximum volume of the stepping reservoir 126 as defined by the stepped position of the stepping piston 114. Thus, the telescoping element 104 indexes toward the telescopically collapsed position by a fixed distance corresponding to the maximum volume of the stepping reservoir 126, after which further travel of the telescoping element 104 toward the telescopically collapsed position is resisted by the fluid 109 in the support reservoir 108, which is confined thereto by the closed stepping valve 118.

When the support valve 116 and the stepping valve 118 return to the locking configuration, travel of the telescoping element 104 toward the telescopically collapsed position continues to be resisted by the fluid 109 in the support reservoir 108, which is now confined thereto by the closed support valve 116. However, because in the locking configuration the stepping valve 118 is open, the fluid 109 in the stepping reservoir 126 can now move, under urging from the stepping piston 114 and spring 124, along the second fluid conduit 130 to the sink reservoir 106. This leaves the stepping reservoir 126 empty, so that if the support valve 116 and the stepping valve 118 return to the stepping configuration, the telescoping element 104 can again index toward the telescopically collapsed position by the fixed distance corresponding to the maximum volume of the stepping reservoir 126.

When both the support valve 116 and the stepping valve 118 are open, the support valve 116 and the stepping valve 118 will collectively be in a free movement configuration in which fluid communication between the support reservoir 108 and the sink reservoir 106 is permitted. In particular, with both the support valve 116 and the stepping valve 118 open, the fluid 109 can flow between the support reservoir 108 and the sink reservoir 106 by way of the fluid conduits 128, 130 and the stepping reservoir 126. The free movement configuration of the support valve 116 and the stepping valve 118 allows for unrestricted adjustment of the telescopic position of the telescoping element 104 relative to the base 102. Moreover, a counterpressure force in the sink reservoir 106, denoted by the arrow CP in FIG. 1, may be provided. With the support valve 116 and the stepping valve 118 in the free movement configuration the telescoping element 104 will move toward the telescopically collapsed position when the force F on the telescoping element 104 exceeds the counterpressure force CP in the sink reservoir 106 and toward the telescopically extended position when the counterpressure force CP in the sink reservoir 106 exceeds the force F on the telescoping element 104. The counterpressure force CF may be provided, for example, by a compressed gas or by one or more biasing members. The total force applied to the stepping piston 114 by the spring 124 and atmospheric pressure should exceed the counterpressure force CF to enable the stepping piston 114 to return to the unstepped position from the stepped position when the support valve 116 and the stepping valve 118 are in the locking configuration. Alternatively, the portion of the stepping chamber 112 opposite the stepping reservoir 126 may be sealed and may be in fluid communication with the sink reservoir 106 to provide a pressure balance and enable the spring 124 to consistently return the stepping piston 114 to the unstepped position.

FIG. 1A shows a schematic representation of a second exemplary telescopic position adjustment mechanism 100A which is similar to the first exemplary telescopic position adjustment mechanism 100. As such, corresponding features are denoted with corresponding reference numerals, but with the suffix "A", with the force and counterpressure force continuing to be denoted by F and CF, respectively. The second exemplary telescopic position adjustment mechanism 100A includes a third valve-governed fluid conduit 132A that directly couples the support reservoir 108A to the sink reservoir 106A. The third fluid conduit 132A is governed by a free movement valve 134A. In the second exemplary telescopic position adjustment mechanism 100A, in the locking configuration the support valve 116A and free movement valve 134A are closed and the stepping valve 118A is open. With the support valve 116A and free movement valve 134A closed, the volume of fluid in the support reservoir 108A is fixed, thereby supporting the telescoping element 104A against the force F, because the fluid 109A is confined to the support reservoir 108A by the support valve 116A and the free movement valve 134A. The free movement valve 134A remains closed in the stepping configuration, in which the support valve 116A is open and the stepping valve 118A is closed. In the free movement configuration, both the support valve 116A and the 118A are closed and the free movement valve 134A is open. Thus, in contrast to the first exemplary telescopic position adjustment mechanism 100, in which fluid 109 flows between the support reservoir 108 and the sink reservoir 106 via the stepping reservoir 126 in the free movement configuration, with the second exemplary telescopic position adjustment mechanism 100A in the free movement configuration, the fluid 109A flows directly between the support reservoir 108A and the sink reservoir 106A via the third fluid conduit 132A.

Figure 1B:
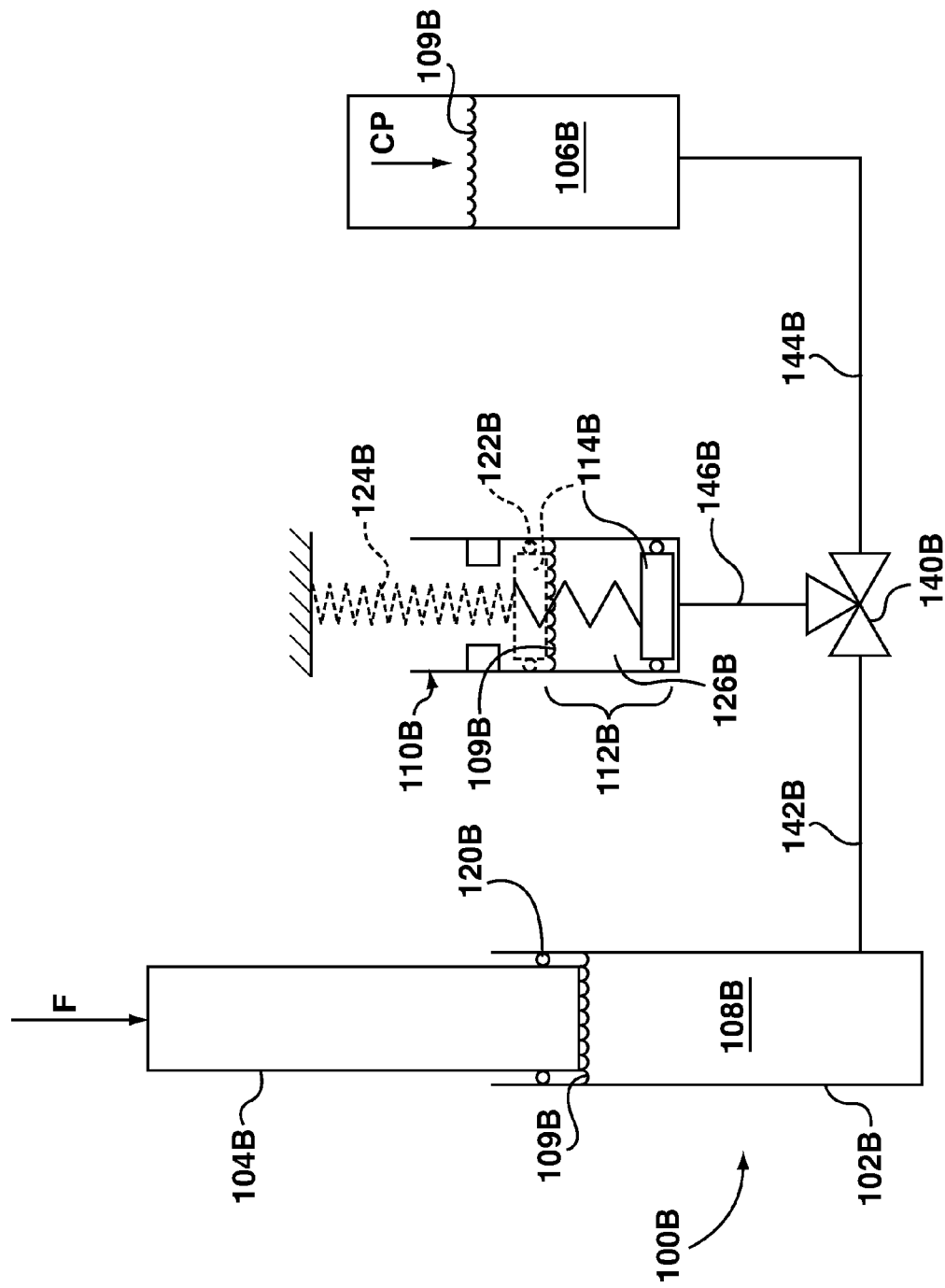
FIG. 1B shows a schematic representation of a third exemplary telescopic position adjustment mechanism.

In FIG. 1B, a schematic representation of a third exemplary telescopic position adjustment mechanism is denoted generally by reference 100B. The third exemplary telescopic position adjustment mechanism 100B is similar to the first exemplary telescopic position adjustment mechanism 100, and corresponding features are denoted with corresponding reference numerals, but with the suffix "B", with the force and counterpressure force continuing to be denoted by F and CF, respectively. As compared to the first exemplary telescopic position adjustment mechanism 100, in the third exemplary telescopic position adjustment mechanism 100B, the support valve 116 and stepping valve 118 are replaced by a single three-way control valve 140B. A first fluid conduit 142B connects the support reservoir 108B in fluid communication with the control valve 140B, a second fluid conduit 144B connects the sink reservoir 106B in fluid communication with the control valve 140B, and a third fluid conduit 146B connects the stepping reservoir 126B in fluid communication with the control valve 140B. With the control valve 140B in the locking configuration, fluid communication between the support reservoir 108B and the stepping reservoir 126B and between the support reservoir 108B and the sink reservoir 106B is obstructed and fluid communication between the stepping reservoir 126B and the sink reservoir 106B is permitted. With the control valve 140B in the stepping configuration, fluid communication between the support reservoir 108B and the stepping reservoir 126B is permitted and fluid communication between the support reservoir 108B and the sink reservoir 106B and between the stepping reservoir 126B and the sink reservoir 106B is obstructed. When the control valve 140B is in the free movement configuration, fluid communication between the support reservoir 108B and the sink reservoir 106B is permitted while fluid communication between the support reservoir 108B and the stepping reservoir 126B and between the sink reservoir 106B and the stepping reservoir 126B is obstructed.

Although not shown in FIG. 1, 1A or 1B, in each embodiment at least one valve actuator is coupled to the respective valve(s) 116, 116A, 118, 118A, 132A, 140B for selectively driving the respective valve(s) 116, 116A, 118, 118A, 132A, 140B into one of the locking configuration, the stepping configuration and the free movement configuration. The valve actuator(s) may be, for example, mechanical, electromechanical or electronic, depending on the type(s) of valve(s) used. Preferably, when the valve actuator(s) drive(s) the respective valve(s) 116, 116A, 118, 118A, 132A, 140B from the locking configuration to the stepping configuration, fluid communication between the stepping reservoir 108, 108A, 108B and the sink reservoir 106, 106A, 106B is obstructed before fluid communication between the support reservoir 108, 108A, 108B and the stepping reservoir 126, 126A, 126B is permitted.

As noted above, certain disclosed embodiments have particular utility in adjusting the height of a bicycle seat relative to a bicycle although the present disclosure and claims are not so limited. FIGS. 2A through 6 and 7B, 7C, 8B, 8C, 9B, 9C, 10B, 10C, 11B and 11C show one exemplary embodiment of a telescopic position adjustment mechanism 200 that may be used to adjust the position of a bicycle seat relative to a bicycle frame.

However, before turning to a detailed description of the operation of the exemplary telescoping position adjustment mechanism 200 (FIGS. 2A to 6 and 7B, 7C, 8B, 8C, 9B, 9C, 10B, 10C, 11B and 11C), reference is made to FIGS. 7A, 8A, 9A, 10A and 11A, which show at 700 a simplified representation of a telescopic position adjustment mechanism similar in function to the telescopic position adjustment mechanism 200 shown in FIGS. 2A to 6 and 7B, 7C, 8B, 8C, 9B, 9C, 10B, 10C, 11B and 11C. The illustration of the simplified telescopic position adjustment mechanism 700 is not intended to depict a practical physical embodiment of a telescopic position adjustment mechanism. For example, various seals and other structural features necessary for practical function are omitted from FIGS. 7A to 11A for ease of illustration, and significant modification to the simplified telescopic position adjustment mechanism 700 would be necessary to render it suitable for manufacture and practical use. Rather, the simplified telescopic position adjustment mechanism 700 is shown and described solely for the purpose of helping the skilled reader to understand the more complicated mechanism of the preferred embodiment, which is the telescopic position adjustment mechanism 200 shown in FIGS. 2A to 6 and 7B to 11B. As such, FIGS. 7A, 8A, 9A, 10A and 11A show the simplified telescopic position adjustment mechanism 700 in configurations corresponding to those of the telescopic position adjustment mechanism 200 shown in FIGS. 7B, 7C, 8B, 8C, 9B, 9C, 10B, 10C, 11B and 11C for comparative purposes.

The simplified telescopic position adjustment mechanism 700 comprises a telescoping member 704 which has a receptacle 703 defined at one end thereof into which a correspondingly sized base 702 is slidably sealingly inserted so as to close the receptacle 703 and form a support reservoir 708 in the receptacle between the telescoping member 704 and the base 702. As such, the telescoping member 704 is slidably received by the base 702 and the reservoir 708, when filled with an incompressible fluid, supports the telescoping member 704 against the base 702.

The telescoping member 704 also has a stepping chamber 712 defined therein, and therefore serves as a housing for the stepping chamber 712. A stepping piston 714 is slidingly sealingly received in the stepping chamber 712, and is reciprocable within the stepping chamber 712 between a stepped position (FIG. 10A) and an unstepped position (FIGS. 7A, 8A, 9A and 11A). A spring 724 biases the stepping piston 714 toward the unstepped position. The stepping piston 714 divides the stepping chamber 712 into a stepping reservoir 726 and an intermediate reservoir 806 opposite the stepping reservoir 726. The stepping reservoir 726 and the intermediate reservoir 806 are each of variable volume, with the maximum volume of the stepping reservoir 726 and the minimum volume of the intermediate reservoir 806 (FIG. 10A) defined by the stepped position of the stepping piston 714 and the minimum volume of the stepping reservoir 726 and the maximum volume of the intermediate reservoir 806 (FIGS. 7A to 9A and 11A) defined by the unstepped position of the stepping piston 714.

A first fluid conduit 728 (best seen in FIGS. 8A, 9A, 10A and 11A) extends between the support reservoir 708 and the stepping reservoir 726, and a second fluid conduit 730 extends between the intermediate reservoir 806 and the sink reservoir 706. An incompressible fluid is contained in the simplified telescopic position adjustment mechanism 700 and can, subject to the valving described further below, flow between the support reservoir 708 and the stepping reservoir 726 and between the stepping reservoir 726 and the sink reservoir 706.

The simplified telescopic position adjustment mechanism 700 has a single valve actuator 750 that is slidably received in the telescoping element 704. The valve actuator 750 is slidably movable relative to the telescoping element 704, independently of the stepping piston 714, to reciprocate through a stepping position (FIGS. 9A and 10A) between a locking position (FIG. 7A) and a free movement position (FIG. 11A) and thereby drive the valve mechanism to reciprocate through the stepping configuration (FIGS. 9A and 10A) between the locking configuration (FIG. 7A) and the free movement configuration (FIGS. 9A and 10A). Thus, as described in greater detail below, when the valve actuator 750 is in the locking position the valve mechanism is in the locking configuration, when the valve actuator 750 is in the stepping position the valve mechanism is in the stepping configuration and when the valve actuator 750 is in the free movement position the valve mechanism is in the free movement configuration.

The valve mechanism in the simplified telescopic position adjustment mechanism 700 consists of a single valve 717 that governs fluid communication between the support reservoir 708 and the sink reservoir 706, between the stepping reservoir 726 and the support reservoir 708 and between the stepping reservoir 726 and the sink reservoir 706. In particular, the valve actuator 750 comprises a tubular shaft and the single valve 717 comprises a support valve valving element 752 carried by the tubular shaft 750 and an actuator fluid conduit 729 defined through the tubular shaft 750.

Figures 7A, 7B:
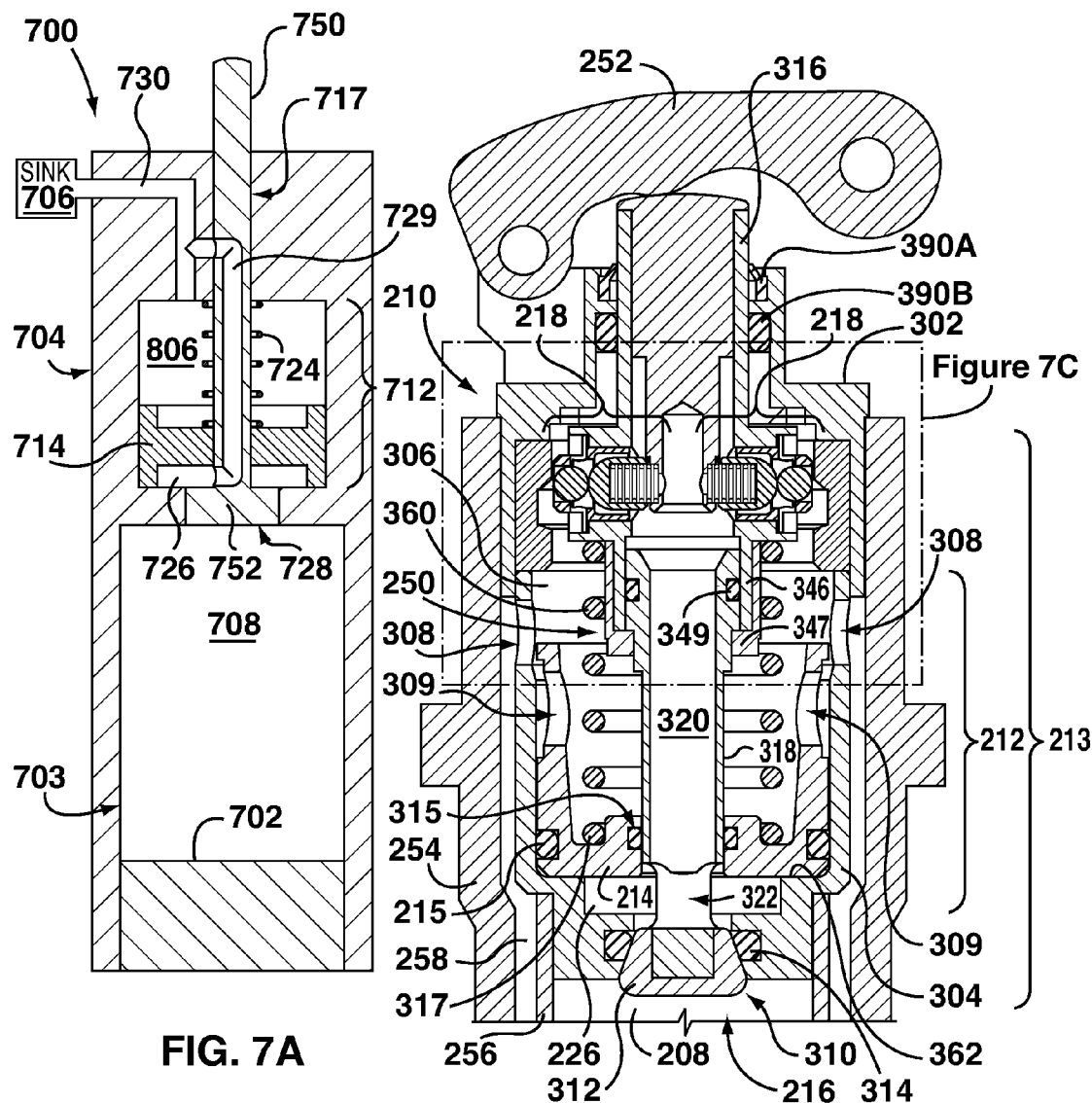
FIG. 7A shows a simplified representation of a telescopic position adjustment mechanism similar in function to the telescopic position adjustment mechanism of FIG. 2A, with the valve mechanism thereof in a locking configuration.
FIG. 7B is a detailed cross-sectional view of the valve mechanism of the telescopic position adjustment mechanism of FIG. 2A, showing the valve mechanism in a locking configuration.

When the valve actuator 750 is in the locking position, as shown in FIG. 7A, the valve 717 is in the locking configuration. In the locking configuration, the support valve valving element 752 closes the first fluid conduit 728 so that fluid communication between the support reservoir 708 and the stepping reservoir 726 is obstructed, while the stepping reservoir 726 communicates with the sink reservoir 706 through the actuator fluid conduit 729, which is in registration with the second fluid conduit 730 leading to the sink reservoir 706.

Figures 8A, 8B:
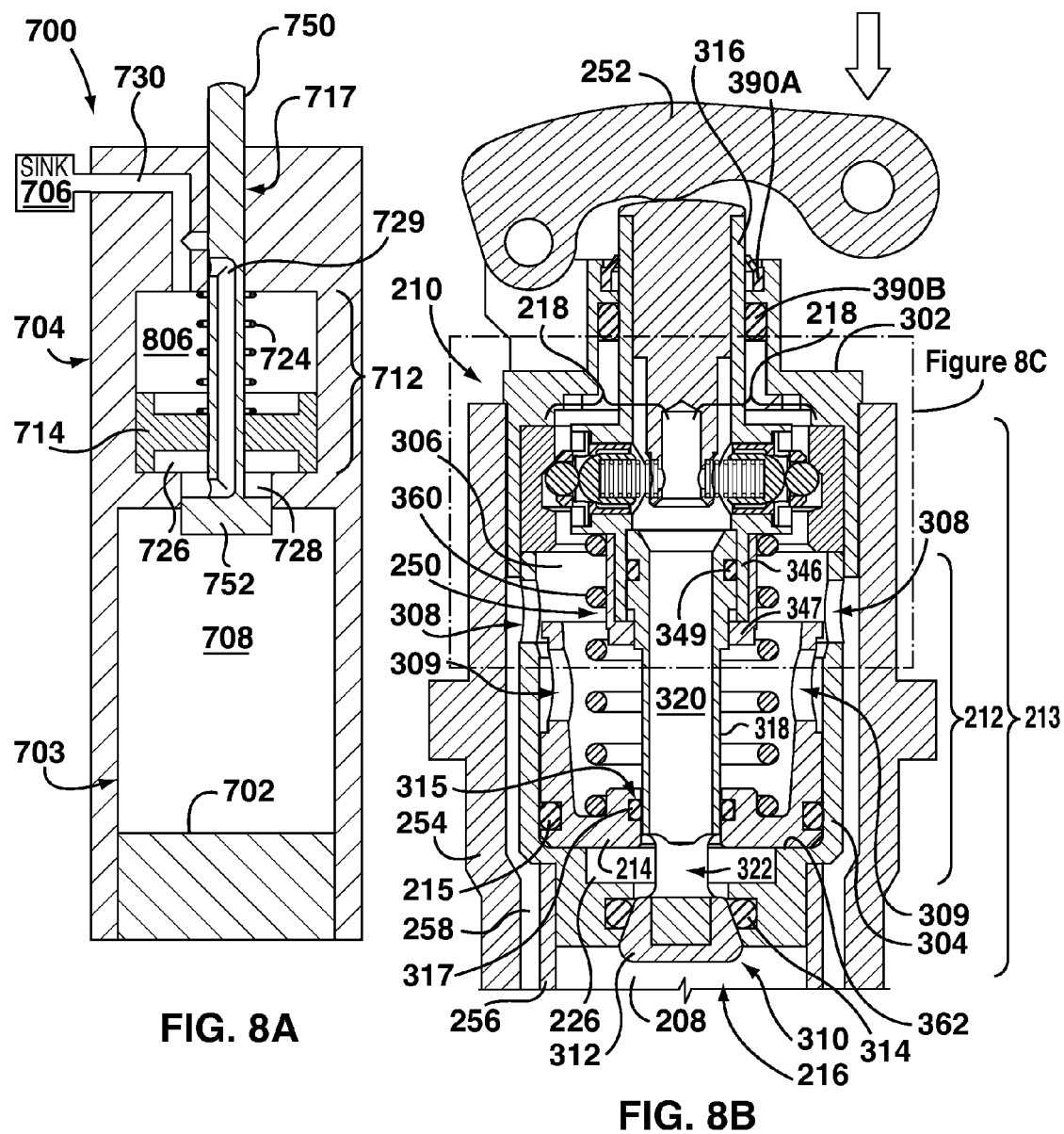
FIG. 8A shows the simplified representation of a telescopic position adjustment mechanism of FIG. 7A, with the valve mechanism thereof moving from the locking configuration toward a stepping configuration.
FIG. 8B is a detailed cross-sectional view of the valve mechanism of the telescopic position adjustment mechanism of FIG. 2A, showing the valve mechanism moving from the locking configuration toward a stepping configuration.

FIG. 8A shows the valve actuator 750 beginning to move from the locking position toward the stepping position, and thereby beginning to drive the valve 717 from the locking configuration to the stepping configuration. As can be seen, in the intermediate position shown in FIG. 8A, the actuator fluid conduit 729 has moved out of registration with the second fluid conduit 730 leading to the sink reservoir 706 while the support valve valving element 752 continues to close the first fluid conduit 728. As such, fluid communication between the stepping reservoir 708 and the sink reservoir 706 is obstructed before fluid communication between the support reservoir 708 and the stepping reservoir 726 is permitted.

FIG. 9A shows the valve actuator 750 in the stepping position, and hence shows the valve 717 in the stepping configuration, with the stepping piston 714 in the unstepped position. Fluid communication between the stepping reservoir 708 and the sink reservoir 706 continues to be obstructed, but the support valve valving element 752 has now moved into the support reservoir 708 and is clear of the first fluid conduit 728. As a result, the first fluid conduit 728 is open and fluid communication between the support reservoir 708 and the stepping reservoir 726 is permitted. Because the actuator fluid conduit 729 is out of registration with the second fluid conduit 730, fluid communication between the stepping reservoir 708 and the sink reservoir 706 continues to be obstructed. As a result, fluid entering the stepping reservoir 726 from the support reservoir 708 through the first fluid conduit 728 has no escape path, and begins to push the stepping piston 714 away from the support reservoir 708, thereby moving the stepping piston 714 from the unstepped position shown in FIG. 9A to the stepped position shown in FIG. 10A. Thus, the volume of fluid in the support reservoir 708 decreases by an amount equal to the maximum volume of the stepping reservoir 726, enabling the telescoping element 704 to telescopically collapse toward the base 702 by a fixed distance corresponding to that volume.

If the valve actuator 750 is moved from the stepping position back to the locking position (FIG. 7A), the support valve valving element 752 again closes the first fluid conduit 728 so that fluid communication between the support reservoir 708 and the stepping reservoir 726 is once again obstructed. In addition, since the actuator fluid conduit 729 has moved back into registration with the second fluid conduit 730, the fluid in the stepping reservoir 726 can flow to the sink reservoir through the actuator fluid conduit 729 and the second fluid conduit 730 as the stepping piston 714 returns to the unstepped position under urging from the spring 724.

If the valve actuator is moved into the free movement position (FIG. 11A), the valve 717 will be in the free movement configuration. In the free movement configuration, the actuator fluid conduit 729 connects the support reservoir 708 in fluid communication with the intermediate reservoir 806, which in turn is in fluid communication with the sink reservoir 706 via the second fluid conduit 730. Thus, the incompressible fluid can bypass the stepping reservoir 726 and flow from the support reservoir 708 to the sink reservoir 706, enabling free telescopic movement of the telescoping element 704 relative to the base 702.

Construction and operation of the exemplary telescoping position adjustment mechanism 200 shown in FIGS. 2A to 6 and 7B to 11B will now be described.

Referring now specifically to FIGS. 2A and 2B, the exemplary telescopic position adjustment mechanism 200 comprises a base 202 having a cylindrical exterior surface and in which is slidingly received a telescoping element 204 also having a cylindrical exterior surface. A saddle clamp 205 is carried by the telescoping element 204 at a distal end thereof for removably receiving a bicycle saddle 240. The base 204 may be secured to the frame of a bicycle (not shown), and by adjusting the telescopic position of the telescoping element 204 relative to the base 202, the height of the bicycle saddle 240 relative to the bicycle frame can be adjusted. FIG. 2A shows the telescoping element 204 in a partially telescopically extended position relative to the base 202 and FIG. 2B shows the telescoping element 204 in a telescopically collapsed position relative to the base 202.

Reference is now made to FIGS. 3 and 4, which are side cross-sectional views of the exemplary telescopic position adjustment mechanism 200 showing the telescoping element 204 in a partially telescopically extended position relative to the base 202 (FIG. 3) and in a telescopically collapsed position relative to the base 202 (FIG. 4), in both cases with the saddle clamp 205 omitted for improved visibility.

In the exemplary telescopic position adjustment mechanism 200, the telescoping element 204 comprises a cylindrical main telescoping tube 254 and a cylindrical spacer tube 256 disposed concentrically inside the main telescoping tube 254. A housing 210 carrying the valve mechanism 213 is received in the distal end 204D of the telescoping element 204, relative to the base 202. The spacer tube 256 is fixedly carried by the housing 210 and extends from the housing 210 along a portion of the main telescoping tube 254 toward the proximal end 204P of the telescoping element 204. The distal end 256D of the spacer tube 256, relative to the base 202, is sealed to the housing 210. As best seen in the enlarged view shown in FIGS. 5A and 5B, the exterior surface 256E of the spacer tube 256 is spaced from the interior surface 254I of the main telescoping tube 254 to define an annular space 258 between the spacer tube 256 and the main telescoping tube 254. The annular space 258 between the spacer tube 256 and the main telescoping tube 254 forms part of a fluid communication path connecting the intermediate reservoir 306 in fluid communication with the sink reservoir 206, as described in greater detail below.

Referring again to FIGS. 3 and 4, the base 202 comprises a cylindrical outer base tube 260 and a cylindrical inner base tube 262 disposed concentrically inside the outer base tube 260. The distal end 262D of the inner base tube 262 is rigidly coupled to the outer base tube 260 by a closure collar 264 disposed adjacent the distal end 202D of the base 260, and the inner base tube 262 extends along a portion of the outer base tube 260 toward the proximal end 202P of the base 202, relative to the telescoping element 204. As best seen in the enlarged view in FIG. 6, the exterior surface 262E of the inner base tube 262 is spaced by the closure collar 264 from the interior surface 260I of the outer base tube 260 to define an annular space 266 between the inner base tube 262 and the outer base tube 260 in which the main telescoping tube 254 is slidably received.

Returning to FIGS. 3 and 4, the inner base tube 262 has closed proximal and distal ends, 262P, 262D, respectively, relative to the telescoping element 204. The distal end 262D of the inner base tube 262 is closed by the closure collar 264. A floating piston 268 is slidingly sealingly received in the inner base tube 262 and divides the interior volume of the inner base tube into the sink reservoir 206, disposed between the floating piston 268 and the closed proximal end 262P of the inner base tube 262, and a counterpressure chamber 270 disposed between the floating piston 268 and the closed distal end 262D of the inner base tube 262. The sink reservoir 206 and the counterpressure chamber 270 are each of variable volume according to the position of the floating piston 268. In the illustrated embodiment, the counterpressure chamber 270 is a counterpressure reservoir for containing compressible gas, and a counterpressure valve 271, such as a Schrader valve, is disposed in the closure collar 264 in fluid communication with the counterpressure reservoir 270 for introducing compressible gas into, and releasing compressible gas from, the counterpressure chamber 270. In other embodiments, other techniques may be used to provide a desired counterpressure force. For example, a biasing member such as a spring may be disposed in the counterpressure chamber 270 to act between the closure collar 264 and the floating piston 268.

A hollow cylindrical fixed piston tube 272 is in sealing engagement with the closed proximal end 262P of the inner base tube 262. The fixed piston tube 272 extends from the closed proximal end 262P of the inner base tube 262 toward the proximal end 202P of the base 202 and terminates at a fixed piston 274. A piston tube fluid conduit 280 is defined in the fixed piston tube 272. The fixed piston tube 272 supports the fixed piston 274 at a fixed longitudinal position relative to the base 202. The fixed piston 274 is slidingly sealingly received in the spacer tube 256 of the telescoping element 264, enabling the spacer tube 256 and hence the telescoping element 204 to slide relative to the fixed piston 274; the fixed piston carries an annular seal 275 that engages the inner surface 256I of the spacer tube 256. The housing 210, spacer tube 256 and fixed piston 274 cooperate to define the support reservoir 208, which is of variable volume depending on the position of the telescoping element 204 relative to the fixed piston 274. An incompressible fluid, when contained in the support reservoir 208, supports the housing 210 against the fixed piston 274 and hence supports the telescoping element 204 against the base 202. An annular guide 276 is sealingly fixed inside the main telescoping tube 254 between the proximal end 256 of the spacer tube 256 and the closed proximal end 262P of the inner base tube 262, and slidingly sealingly receives the fixed piston tube 272. Thus, when the telescoping element 204 telescopes relative to the base 202, the interior surface 256I (FIG. 5) slides along the fixed piston 274 and the annular guide 276 slides along the fixed piston tube 272. The annular guide 276 has an annular seal 277 that engages the fixed piston tube 272.

Figure 5A:
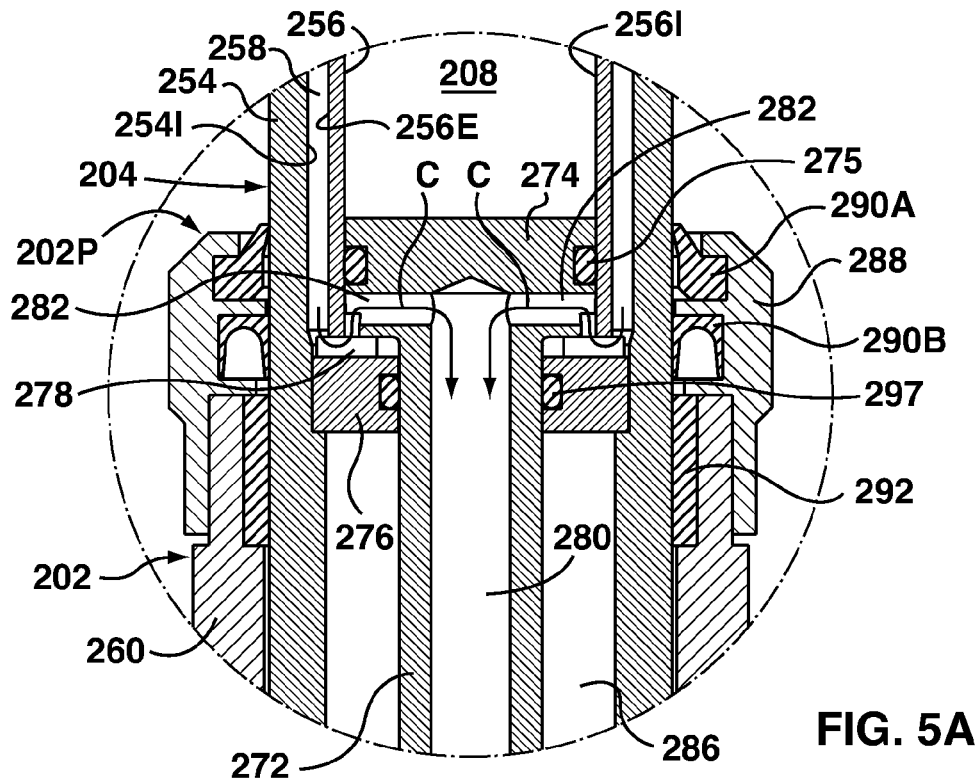
FIG. 5A is a more detailed view of a first portion of the cross-sectional view shown in FIG. 3.
Figure 5B:
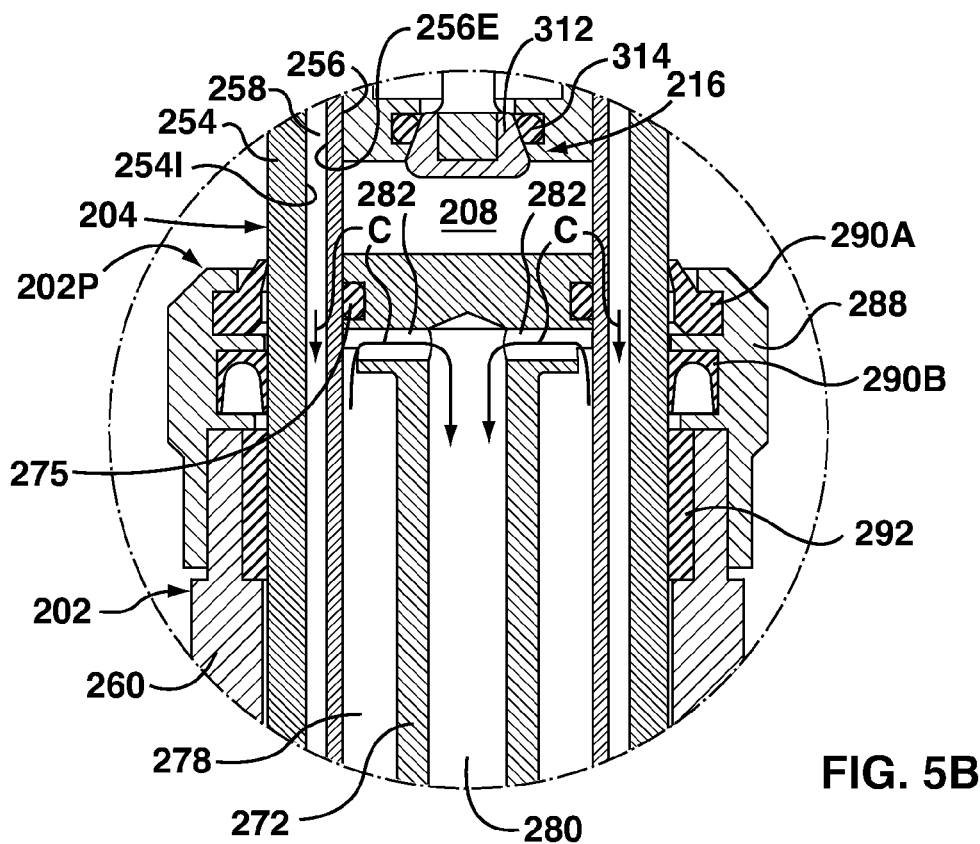
FIG. 5B is a more detailed view of a first portion of the cross-sectional view shown in FIG. 4.

As shown by the arrows C in FIGS. 5A and 5B, the annular space 258 between the spacer tube 256 and the main telescoping tube 254 is in fluid communication with the interior volume 278 of the spacer tube 256 between the annular guide 276 and the fixed piston 274. The interior volume 278 of the spacer tube 256 is in fluid communication with the piston tube fluid conduit 280 via inlets 282 disposed between the distal end of the fixed piston 274 and the annular guide 276. In the illustrated embodiment the inlets 282 are defined through the fixed piston 274 itself; in other embodiments the pistons may be defined through the wall of the fixed piston tube 272. The piston tube fluid conduit 280 is in fluid communication with the sink reservoir 206 through a sink aperture 284 in the closed proximal end of the inner base tube 262. Thus, notwithstanding the sink aperture 284, the proximal end 262P of the inner base tube 262 is closed in that it is not in fluid communication with the annular space 286 between the main telescoping tube 254 and the fixed piston tube 272.

As will be explained in greater detail below, the intermediate reservoir 306 is in fluid communication with the annular space 258 between the spacer tube 256 and the main telescoping tube 254. Since this annular space 258 is in fluid communication with the interior volume 278 of the spacer tube 256, the spacer tube 256 is in fluid communication with the piston tube fluid conduit 280 and the piston tube fluid conduit 280 is in fluid communication with the sink reservoir 206, the intermediate reservoir 306 is in fluid communication with the sink reservoir 206.

Referring now specifically to FIGS. 5A and 5B, the base 202 includes a proximal cap 288 at its proximal end 202P. The proximal cap 288 carries a resilient annular wiper 290A to inhibit ingress of detritus between the base 202 and the telescoping element 204 and an annular seal 290B to sealingly engage the telescoping element 204. The outer base tube 260 carries a first annular guide bushing 292 adjacent the proximal end 202P of the base 202, between the exterior surface 254I of the main telescoping tube 254 and the interior surface 260I (FIG. 6) of the outer base tube 260, and the annular guide 276 carries an annular seal 294 that slidably seals the annular guide 276 to the fixed piston tube 272.

Figure 6:
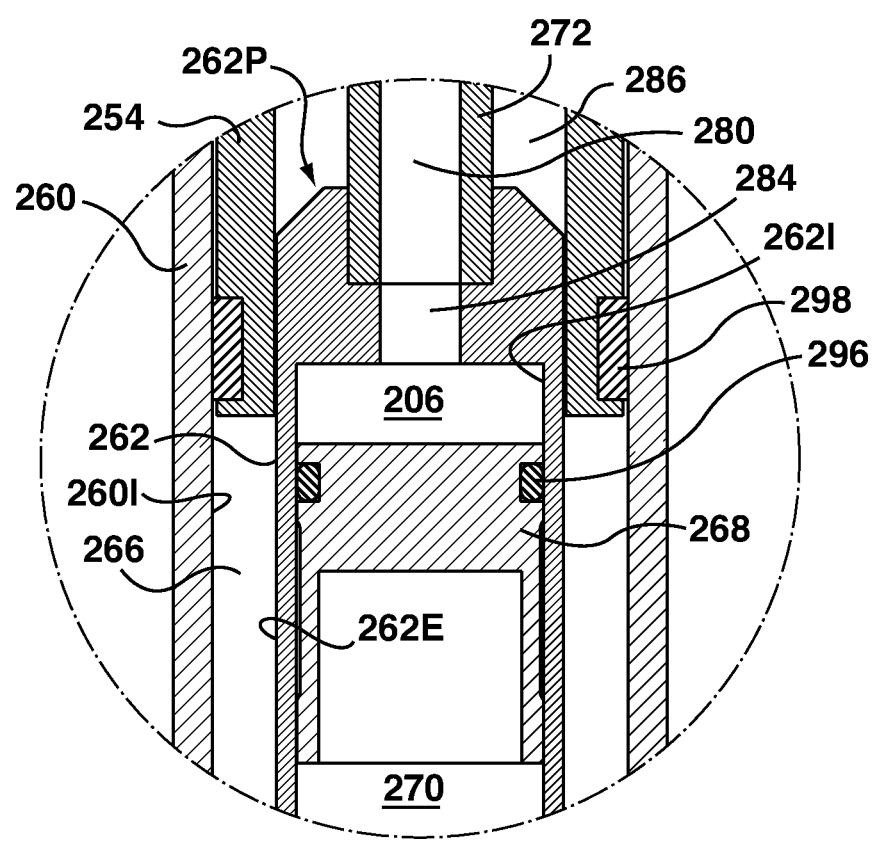
FIG. 6 is a more detailed view of a second portion of the cross-sectional view shown in FIG. 3.

Now referring to FIG. 6, the floating piston 268 carries an annular seal 296 that slidably sealingly engages the interior surface 262I of the inner base tube 262, and the main telescoping tube 254 carries a second annular guide bushing 298, adjacent the proximal end 204P of the telescoping element 204, between the main telescoping tube 254 and the outer base tube 260.

Reference is now made specifically to FIGS. 7B, 7C, 8B, 8C, 9B, 9C, 10B, 10C, 11B and 11C, which show enlarged cross-sectional views of the housing 210 and the valve mechanism 213 carried by the housing 210.

The housing 210 comprises a valve-carrying portion 302 which carries the valve actuator 250 and therefore carries the stepping valves 218 carried by the valve actuator 250, and a piston-housing portion 304 in which the stepping chamber 212 is defined, with the stepping piston 214 slidingly sealingly received in the stepping chamber 212. The valve-carrying portion 302 carries a resilient annular wiper 390A to inhibit ingress of detritus between the valve-carrying portion 302 and the valve actuator 250 and an annular seal 390B to sealingly engage the valve actuator 250. The annular wiper 390A is optional and may be omitted, for example to reduce cost. The valve-carrying portion 302 cooperates with the piston-housing portion 304 to close the stepping chamber 212 and confine the stepping piston 214 therein. The stepping piston 214 is reciprocable within the stepping chamber 212 between a stepped position (FIG. 10B) and an unstepped position (FIGS. 7B, 8B, 9B and 11B), and carries an annular seal 215 that engages the inner wall of the piston-housing portion 304. The stepping piston 214 divides the stepping chamber 212 into a stepping reservoir 226 and an intermediate reservoir 306 opposite the stepping reservoir 226. The stepping reservoir 226 and the intermediate reservoir 306 defined by the stepping piston 214 in cooperation with the stepping chamber 212 are each of variable volume. The maximum volume of the stepping reservoir 226 (FIG. 10B) is defined by the stepped position of the stepping piston 214 and the minimum volume of the stepping reservoir 226 (FIGS. 7B, 8B, 9B and 11B) is defined by the unstepped position of the stepping piston. Correspondingly, the maximum volume of the intermediate reservoir 306 is defined by the unstepped position (FIGS. 7B, 8B, 9B and 11B) of the stepping piston 214 and the minimum volume of the intermediate reservoir 306 (FIG. 10B) is defined by the stepped position of the stepping piston 214. As noted previously, the intermediate reservoir 306 is in fluid communication with the sink reservoir 206 (FIGS. 3 and 4). Specifically, housing apertures 308 are defined in the piston-housing portion 304 of the housing 210; these housing apertures 308 communicate with the annular space 258 between the spacer tube 256 and the main telescoping tube 254 and this annular space 258 forms part of a fluid communication path leading to the sink reservoir 206 as described above. Fluid can flow from the intermediate reservoir 306 over the lip 311 of the stepping piston 214 to reach the housing apertures 308. In the illustrated embodiment, the stepping piston 214 also includes piston apertures 309 which provide an additional fluid communication path from the intermediate reservoir 306 to the housing apertures 308.

The support reservoir 208 is in valve-governed fluid communication with the stepping reservoir 226. A support valve aperture 310 (FIGS. 9B to 11B) is defined through the piston-housing portion 304 of the housing 210 between the support reservoir 208 and the stepping reservoir 226. The support valve aperture 310 thereby provides a fluid path between the support reservoir 208 and the stepping reservoir 226. The support valve 216 is interposed in this fluid path to govern fluid communication between the support reservoir 208 and the stepping reservoir 226. The support valve 216 comprises the support valve aperture 310 in cooperation with a support valve valving element 312 of complementary shape which is carried by the valve actuator 250 for movement into and out of sealing engagement with the support valve aperture 310, which forms a valve seat for the support valve valving element 312. An annular seal 314 is provided in the support valve aperture 310 to sealingly engage the support valve valving element 312.

Figure 10C:
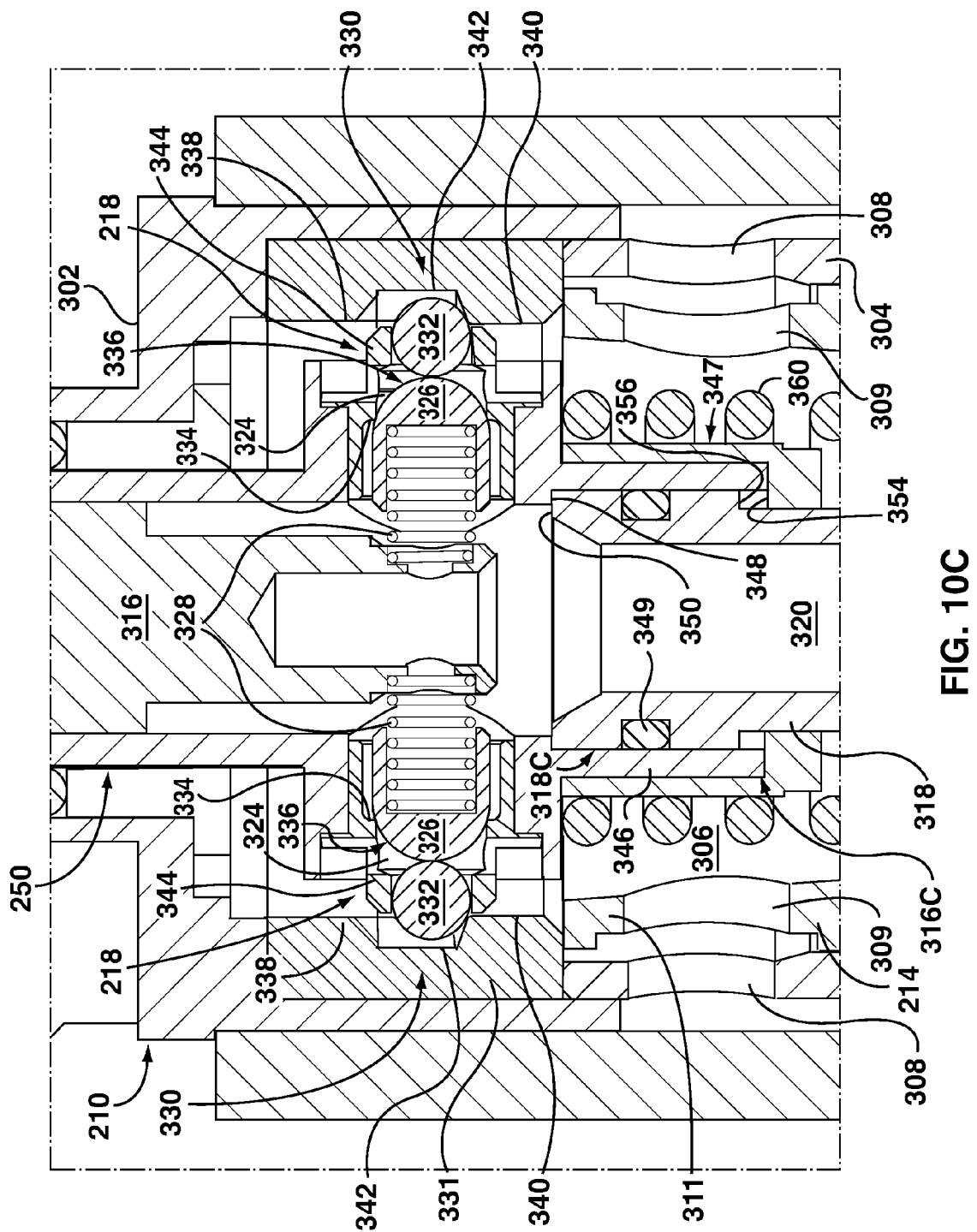
FIG. 10C is a further detailed cross-sectional view of the portion of the valve mechanism of the telescopic position adjustment mechanism of FIG. 2A containing the stepping valves thereof, with the valve mechanism in a stepping configuration and the stepping piston in a stepped position.
Figure 11A:
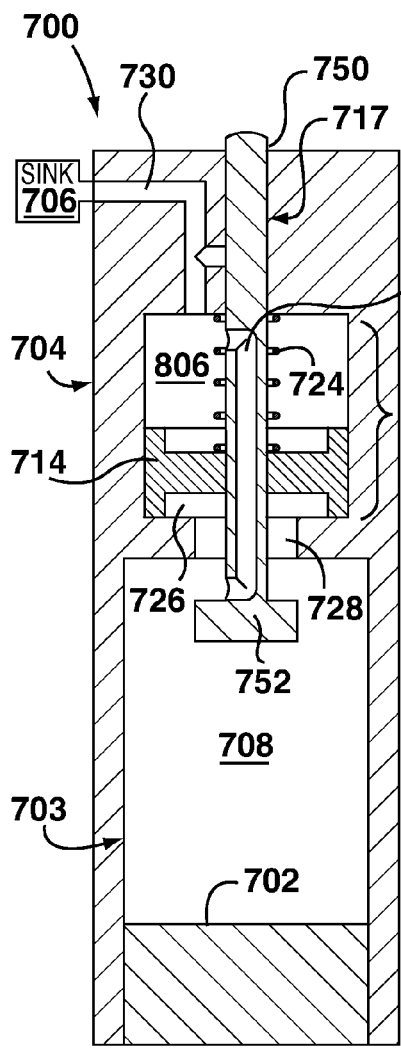
FIG. 11A shows the simplified representation of a telescopic position adjustment mechanism of FIG. 7A, with the valve mechanism thereof in a free movement configuration.
Figure 11B:
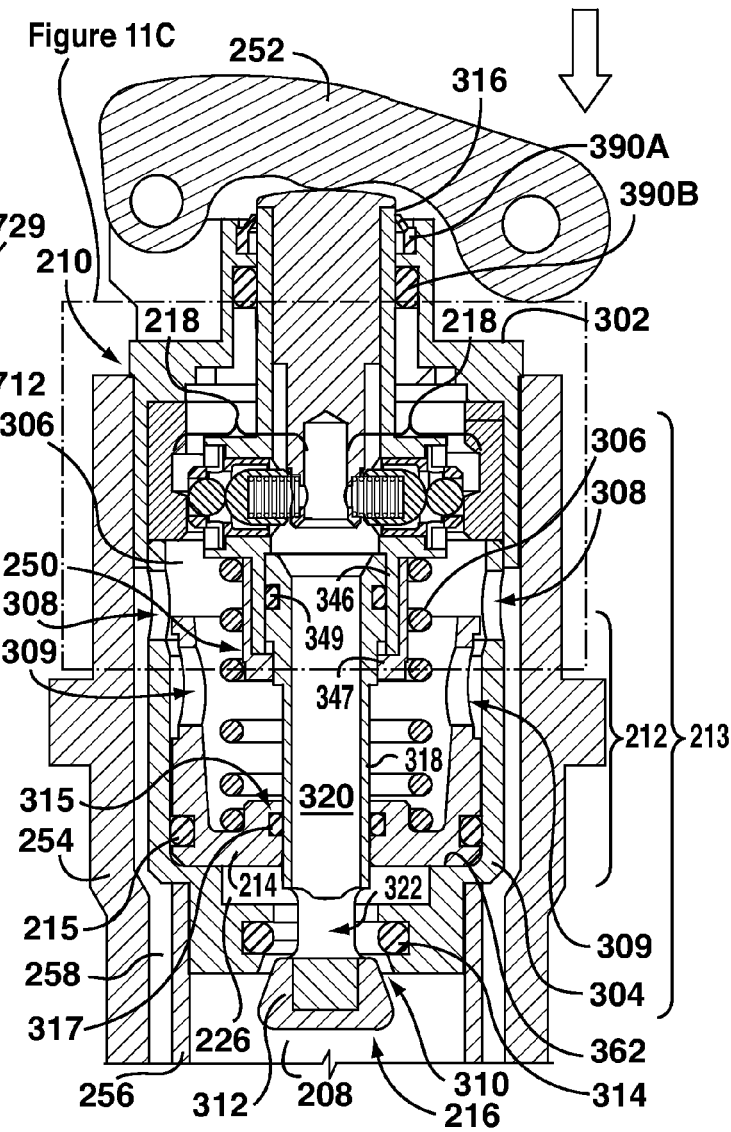
FIG. 11B is a detailed cross-sectional view of the valve mechanism of the telescopic position adjustment mechanism of FIG. 2A, showing the valve mechanism in a free movement configuration.

The valve actuator 250 is slidably received in the housing 210, in particular in the valve-carrying portion 302 thereof, and is slidably movable relative to the housing 210 to reciprocate through a stepping position (FIGS. 9B and 10B) between a locking position (FIG. 7B) and a free movement position (FIG. 11B). A driver 252 is pivotally carried by the telescoping element 204 for driving the valve actuator 250 from the locking position through the stepping position to the free movement position. The driver 252 may be connected to a sheathed cable (not shown) to permit remote operation of the driver 252 and hence remote operation of the valve actuator 250.

The valve actuator 250 comprises a stepping valve actuator portion 316 and a support valve actuator portion 318 that carries the support valve valving element 312. An actuator fluid conduit 320 is defined in the support valve actuator portion 318 and extends into the stepping valve actuator portion 316. Stepping valve passages 324 (FIGS. 7C, 8C, 9C, 10C, 11C) are formed in the stepping valve actuator portion 316, and connect the actuator fluid conduit 320 in valve-governed fluid communication with the intermediate reservoir 306; this fluid communication is governed by the stepping valves 218. One or more actuator inlets 322 communicating with the actuator fluid conduit 320 are defined in the valving end of the support valve actuator portion 318, superiorly of the support valve valving element 312. When the valve actuator 250 is in the locking position, as shown in FIG. 7B, the stepping valves 218 are open and permit fluid communication between the stepping reservoir 226 and the intermediate reservoir 306 via the actuator inlets 322, the actuator fluid conduit 320 and the stepping valve passages 324.

The stepping piston 214 includes an actuator aperture 315 in which the valve actuator 250, in particular the support valve actuator portion 318 thereof, is slidably sealingly received so that the valve actuator 250 moves independently of the stepping piston 214. A seal 317 is disposed in the actuator aperture 315 and engages the support valve actuator portion 318.

The single valve actuator 250 selectively drives the support valve 216 and the stepping valves 218 to reciprocate through a stepping configuration between a locking configuration and a free movement configuration. When the valve actuator 250 is in the locking position the support valve 216 and the stepping valves 218 are in a locking configuration (FIGS. 7B and 7C) in which the support valve 216 is closed and the stepping valves 218 are open. When the valve actuator 250 is in the stepping position the support valve 216 and the stepping valves 218 are in a stepping configuration (FIGS. 9B and 10B) in which the support valve 216 is open and the stepping valves 218 are closed, and when the valve actuator 250 is in the free movement position the support valve 216 and the stepping valves 218 are in a free movement configuration (FIG. 11B) in which the support valve 216 and the stepping valves 218 are open.

As noted above, the valve actuator 250 comprises a stepping valve actuator portion 316 and a support valve actuator portion 318. The support valve actuator portion 318 is slidingly telescopically received by the stepping valve actuator portion 316, so that movement of the valve actuator 250 from the locking position (FIG. 7B) to the stepping position (FIGS. 9B and 10B) comprises a stepping valve driving stage and a support valve driving stage. In the exemplary telescopic position adjustment mechanism 200, the stepping valve driving stage is the movement of the valve actuator 250 from the configuration shown in FIG. 7B to the configuration shown in FIG. 8B. In this stepping valve driving stage, the stepping valve actuator portion 316 slides relative to the housing 210 while also sliding telescopically along the support valve actuator portion 318, toward the support reservoir 308, to drive the stepping valves 218 closed while the support valve actuator portion 318 remains static relative to the housing 210 and the support valve 216 remains closed. Operation of the stepping valves 218 is described in greater detail below.

In the exemplary telescopic position adjustment mechanism 200, the support valve driving stage is the movement of the valve actuator 250 from the configuration shown in FIG. 8B to the configuration shown in FIGS. 9B and 10B. In the support valve driving stage, the stepping valve actuator portion 316 slides relative to the housing 210 and moves the support valve actuator portion 318 linearly relative to the housing 210 to drive the support valve 216 open by moving the support valve valving element 312 out of engagement with the valve seat formed by the support valve aperture 310 and seal 314.

As best seen in FIGS. 7C, 8C, 9C, 10C and 11C, the connecting end 316C of the stepping valve actuator portion 316 includes a tubular receptacle 346 in which the connecting end 318C of the support valve actuator portion 318 is slidably received. The connecting end 318C of the support valve actuator portion 318 carries an annular seal 349 that engages the inner surface of the tubular receptacle 346. The distal end of the tubular receptacle 346 has an inwardly projecting annular shoulder 348 for engaging the end face 350 of the connecting end 318C of the support valve actuator portion 318. A cap 347 is fitted over the support valve actuator portion 318 and secured over the tubular receptacle 346, and includes an inwardly projecting annular shoulder 354 for engaging a corresponding outwardly projecting annular shoulder 356 on the support valve actuator portion 318.

Figure 7C:
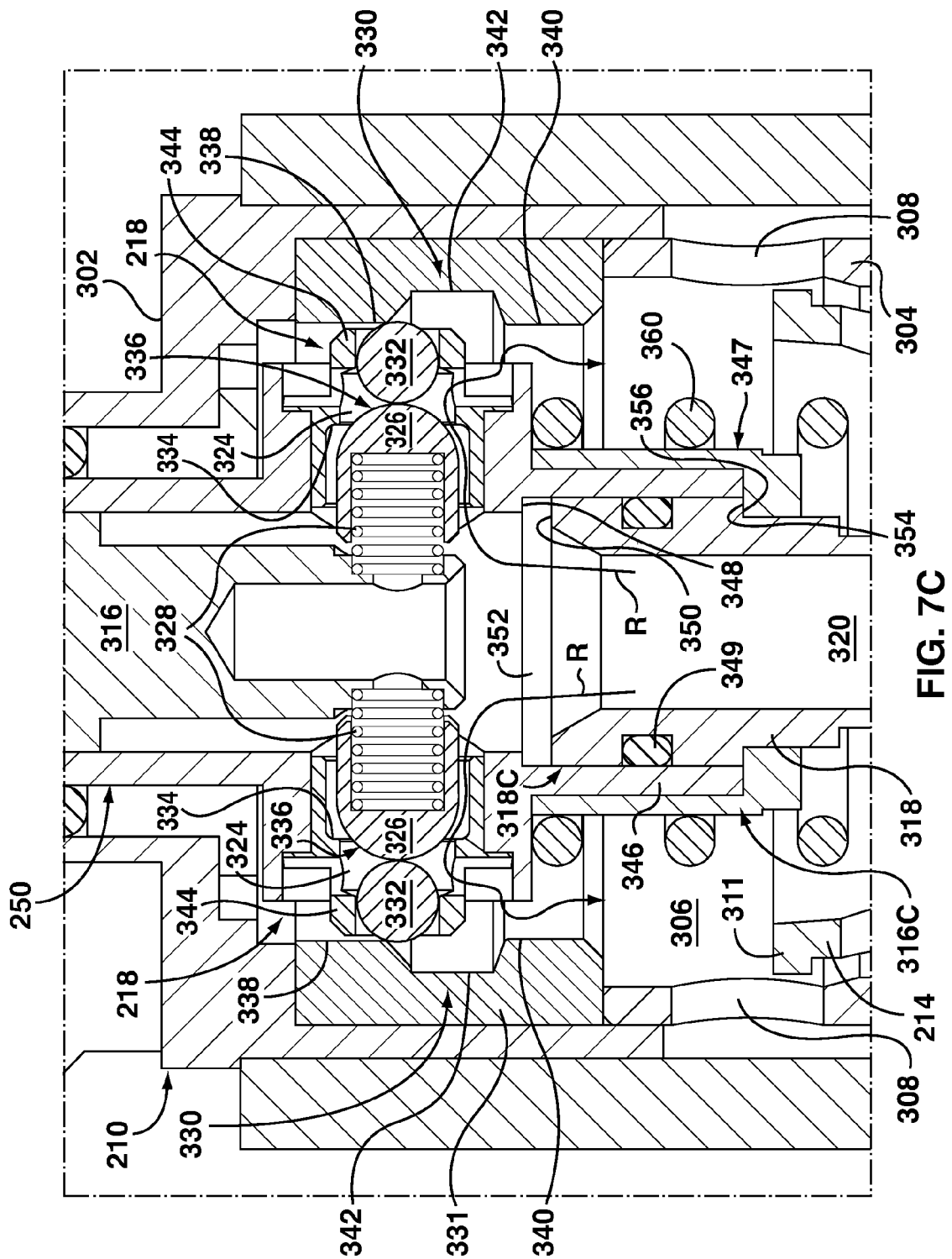
FIG. 7C is a further detailed cross-sectional view of the portion of the valve mechanism of the telescopic position adjustment mechanism of FIG. 2A containing the stepping valves thereof, with the valve mechanism in a locking configuration.
Figure 8C:
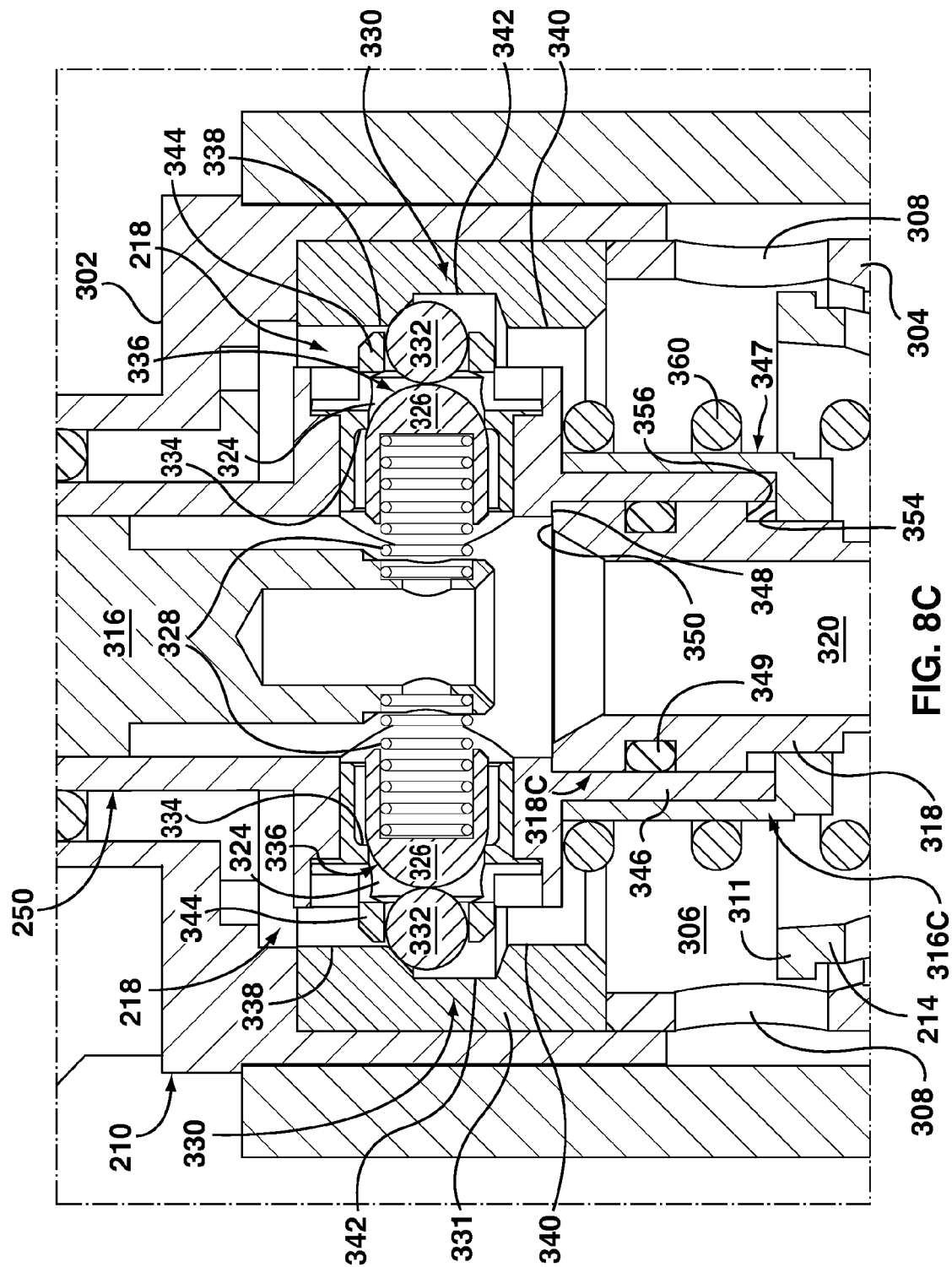
FIG. 8C is a further detailed cross-sectional view of the portion of the valve mechanism of the telescopic position adjustment mechanism of FIG. 2A containing the stepping valves thereof, with the valve mechanism moving from the locking configuration toward a stepping configuration.
Figure 9C:
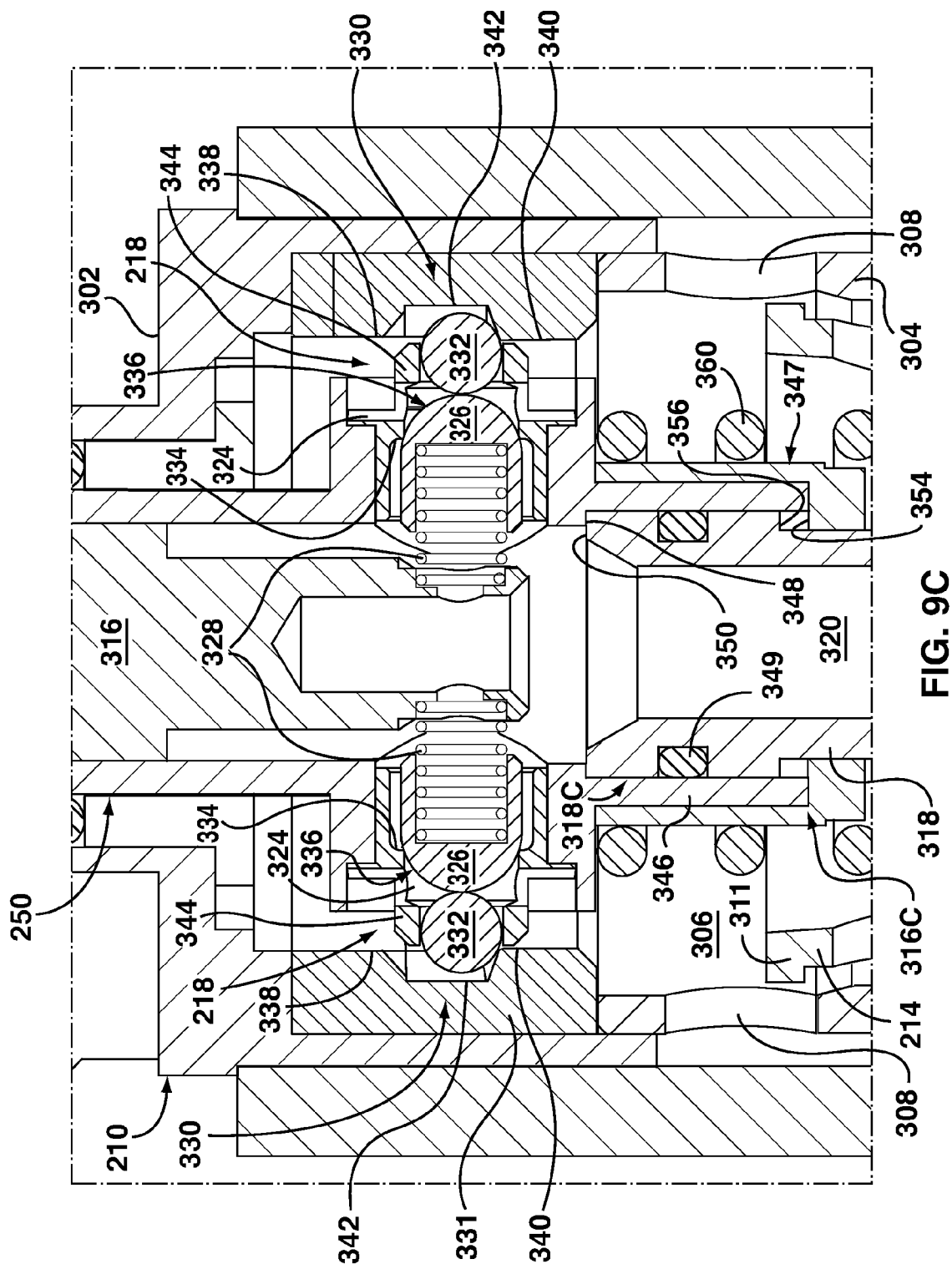
FIG. 9C is a further detailed cross-sectional view of the portion of the valve mechanism of the telescopic position adjustment mechanism of FIG. 2A containing the stepping valves thereof, with the valve mechanism in a stepping configuration and the stepping piston thereof in an unstepped position.

When the valve actuator 250 is in the locking position (FIGS. 7B and 7C), the inwardly projecting annular shoulder 348 on the stepping valve actuator portion 316 is spaced from the end face 350 of the connecting end 318C of the support valve actuator portion 318 so as to define a gap 352 therebetween (FIG. 7C). During the stepping valve driving stage (from FIGS. 7B and 7C to FIGS. 8B and 8C), the stepping valve actuator portion 316 slides along the support valve actuator portion 318 until the gap 352 is closed and the inwardly projecting annular shoulder 348 on the stepping valve actuator portion 316 engages the end face 350 of the connecting end 318C of the support valve actuator portion 318, as shown in FIGS. 8B and 8C. Further movement of the stepping valve actuator portion 316 toward the support reservoir 308 will also move the support valve actuator portion 318, toward the support reservoir 308, thereby beginning the support valve driving stage. Upon return from the stepping position or the free movement position, the inwardly projecting annular shoulder 354 on the cap 347 engages the corresponding outwardly projecting annular shoulder 356 on the support valve actuator portion 318 to pull the support valve actuator portion 318 back to the locking position. A biasing member in the form of a spring 360 is disposed in the intermediate reservoir and acts between the stepping piston 214 and the stepping valve actuator portion 316 to urge the stepping piston 214 toward the unstepped position. An annular shoulder 362 on the piston-housing portion 304 of the housing acts as a stop that engages the stepping piston 214 when the stepping piston 214 reaches the unstepped position. This enables the spring 360 to act between the housing 210 and the valve actuator 250 to urge the valve actuator 250 toward the locking position. Thus, when the stepping valves 218 are open to relieve fluid pressure in the stepping reservoir 226 and there is no external force applied to the valve actuator 250, the spring 360 urges the stepping valve actuator portion 316 away from the stepping piston 214. Via engagement between the inwardly projecting annular shoulder 354 on the cap 347 and the corresponding outwardly projecting annular shoulder 356 on the support valve actuator portion 318, the stepping valve actuator portion 316 carries the support valve actuator portion 320 to return to the locking position under urging from the spring 360, closing the support valve 216.

The stepping reservoir 226 is in valve-governed fluid communication with the sink reservoir 206, and the stepping valves 218 are interposed in the fluid path between the stepping reservoir 226 and the sink reservoir 206 to govern fluid communication therebetween. Specifically, the stepping reservoir 226 communicates with the sink reservoir 206 through the actuator fluid conduit 320 and the intermediate reservoir 306, and the stepping valves 218 are interposed in this fluid path between the actuator fluid conduit 320 and the intermediate reservoir 306. Construction of the stepping valves 218 will be described in greater detail below.

Reference is now made specifically to FIGS. 7C, 8C, 9C, 10C and 11C, which provide a more detailed cross-sectional view showing two stepping valves 218. Although only two stepping valves 218 are visible in the cross-sectional view shown in FIGS. 7C, 8C, 9C, 10C and 11C, in a preferred embodiment five equally circumferentially spaced stepping valves 218 are provided. Each stepping valve 218 comprises a stepping valve passage 324, a stepping valve valving element 326, a biasing member 328, a cam surface 330 and a ball 332.

Figure 11C:
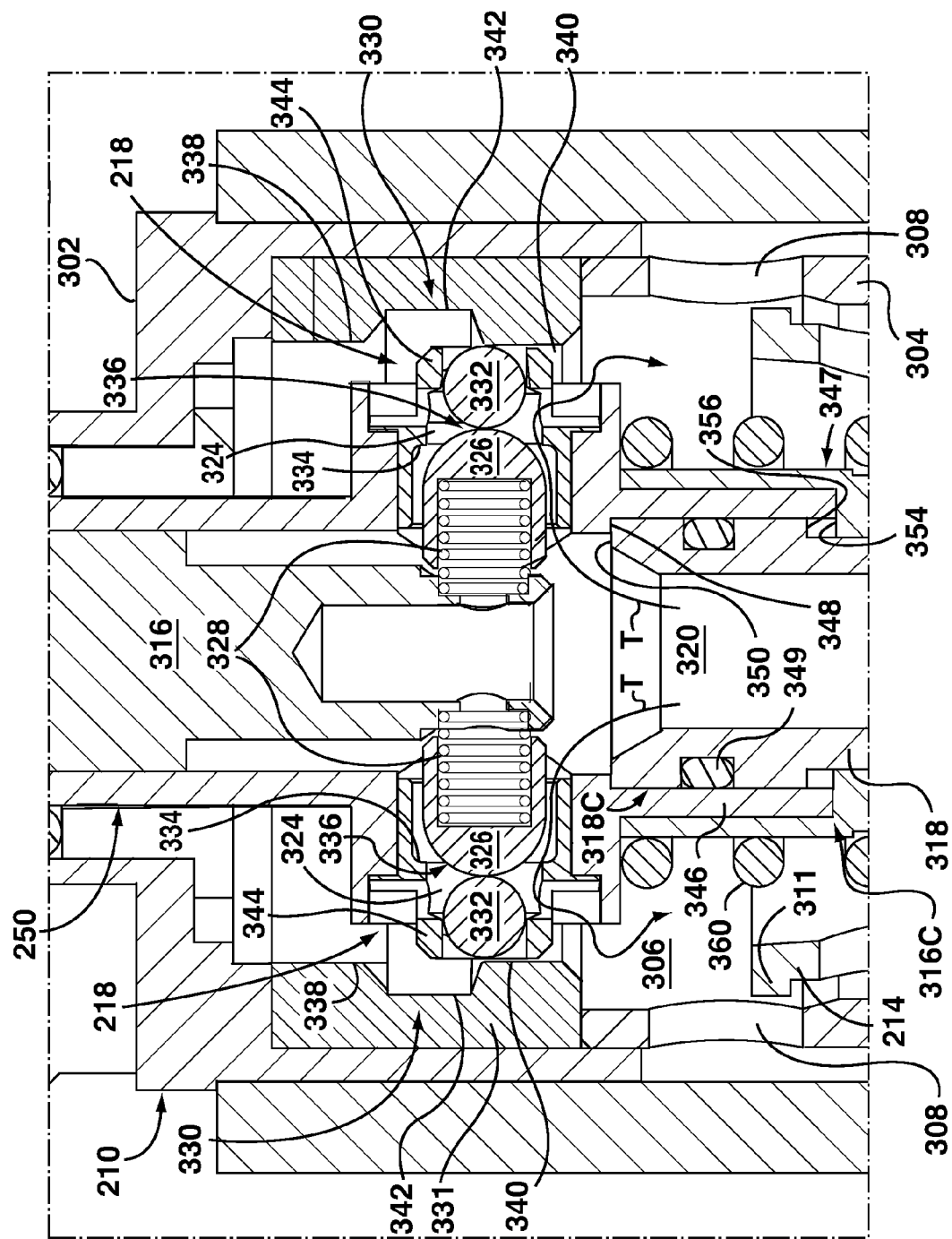
FIG. 11C is a further detailed cross-sectional view of the portion of the valve mechanism of the telescopic position adjustment mechanism of FIG. 2A containing the stepping valves thereof, with the valve mechanism in a free movement configuration.

The stepping valve passages 324 are formed in the stepping valve actuator portion 316, and connect the actuator fluid conduit 320 in fluid communication with the intermediate reservoir 306, as shown by the arrows R in FIGS. 7C and 11C. Each stepping valve passage 324 includes an inwardly projecting annular shoulder 334. In the illustrated embodiment the annular shoulder 334 is formed by a narrowing of the stepping valve passage 324; alternatively an annular flange may be used. The inwardly projecting annular shoulder 334 acts as a valve seat, as explained further below.

Each stepping valve valving element 326 is carried by the stepping valve actuator portion 316, and is movable, relative to a respective stepping valve passage 324, into and out of sealing engagement with the inwardly projecting annular shoulder 334. For this purpose, each stepping valve valving element 326 has a tapered end 336 that is complementary in shape to the inwardly projecting annular shoulder 334 in the corresponding stepping valve passage 324. In the illustrated embodiment the biasing member 328 takes the form of a coil spring, and acts between the stepping valve actuator portion 316 and the stepping valve valving element 326 to bias the stepping valve valving element 326 into engagement with the inwardly projecting annular shoulder 334.

In the illustrated embodiment, the cam surface 330 for each stepping valve 218 is formed by a single continuous annular cam channel defined on an interior surface of the housing 210 and extending therearound opposite the stepping valve passages 324. Specifically, a cam ring 331 is received in the housing 210, with the cam channel that forms the cam surface 330 being defined in the interior surface of the cam ring 331. Thus, the cam surface 330 of each stepping valve is part of a larger overall cam surface formed by the cam channel in the cam ring 331. In alternative embodiments, individual spaced-apart cam surfaces may be provided opposite each of the stepping valve passages 324. The cam surface 330 comprises a first cam surface portion 338, a second cam surface portion 340, and a ball receptacle 342 defined between the first cam surface portion 338 and the second cam surface portion 340. The first cam surface portion 338 and second cam surface portion 340 each extends further inwardly than the ball receptacle 342 so that the ball receptacle 342 forms a trough between the first cam surface portion 338 and the second cam surface portion 340. The cam surface 330 tapers outwardly from the first cam surface portion 338 toward the ball receptacle and tapers inwardly from the ball receptacle 342 to the second cam surface portion 340.

The stepping valve actuator portion 316 includes an annular ball guide 344 for each stepping valve 218. The ball 332 of each stepping valve 218 is captured between the cam surface 330 and the tapered end 336 of the stepping valve valving element 326 and is carried along the cam surface 330 by the ball guide 344 during movement of the stepping valve actuator portion 320.

As shown in FIG. 7C, when the valve actuator 250 is in the locking position, the ball guide 344, and hence the ball 332, of each stepping valve 218 is positioned opposite the first cam surface portion 338. The first cam surface portion 338 forces the ball 332 against the tapered end 336 of the stepping valve valving element 326, overcoming the spring 328 and keeping the tapered end 336 of the stepping valve valving element 326 disengaged and spaced from the inwardly projecting annular shoulder 334. This permits fluid flow past the inwardly projecting annular shoulder 334, since fluid can flow through the gap between the stepping valve valving element 326 and the inwardly projecting annular shoulder 334 as shown by the arrows R. Thus, when the valve actuator 250 is in the locking position, the stepping valves 218 are open. This permits fluid in the stepping reservoir 226 to flow, under urging from the stepping piston 214 and spring 360, through the actuator fluid conduit 320 into the intermediate reservoir 306 and from there into the sink reservoir 210.

As the stepping valve actuator portion 316 slides along the support valve actuator portion 318 during the stepping valve driving stage (from FIGS. 7B and 7C to FIGS. 8B and 8C), the ball guides 344 carry the respective balls 332 along the cam surface 330 from the first cam surface portion 338 into the ball receptacle 342. Thus, when the valve actuator 250, in particular the stepping valve actuator portion 316 thereof, is in the stepping position, each ball 332 rests in the ball receptacle 342. This permits the springs 328 to push the tapered ends 336 of the stepping valve valving elements 326 into sealing engagement with their respective inwardly projecting annular shoulders 334, thereby closing the stepping valves 218 and inhibiting fluid flow past the inwardly projecting annular shoulder 334.

As the valve actuator 250 moves through the support valve driving stage (from the configuration shown in FIGS. 8B and 8C to the configuration shown in FIGS. 9B and 10B and 9C and 10C), the balls 332 remain in the ball receptacle 342 and the tapered ends 336 of the stepping valve valving elements 326 remain, under urging from the springs 328, in sealing engagement with their respective inwardly projecting annular shoulders 334. As a result, when the valve actuator 250 is in the stepping position with the support valve 216 open, the stepping valves 218 are closed. Thus, fluid entering the actuator fluid conduit 320 cannot flow past the inwardly projecting annular shoulders 334, and fluid from the support reservoir 208 will flow into the stepping reservoir 226, moving the stepping piston 214 from the unstepped position (FIGS. 9B and 9C) to the stepped position (FIGS. 10B and 10C).

When the valve actuator 250 moves past the stepping position toward the free position, the ball guides 344 carry the respective balls 332 along the cam surface 330 from the ball receptacle 342 to the second cam surface portion 340. When the valve actuator 250 reaches the free movement position (FIGS. 11B and 11C), the second cam surface portion 340 forces the balls 332 against the tapered end 336 of the respective stepping valve valving element 326. The stepping valve valving elements 326 are pushed back against their respective springs 328, keeping the tapered end 336 of each stepping valve valving element 326 disengaged and spaced from the respective inwardly projecting annular shoulder 334 so as to permit fluid flow through the gap between the stepping valve valving element 326 and the inwardly projecting annular shoulder 334. Thus, when the valve actuator 250 is in the free movement position, the stepping valves 218 are open. As a result, fluid entering the actuator fluid conduit 320 can flow past the inwardly projecting annular shoulders 334 into the intermediate reservoir 306 and from there into the sink reservoir 206, as indicated by the arrows T (FIG. 11C).

As explained above, the support reservoir 208 is in valve-governed fluid communication with the sink reservoir 206 via the support valve aperture 310, actuator inlets 322, actuator fluid conduit 320, stepping valves 218, intermediate reservoir 306, piston apertures 309 (when the stepping piston 214 is in the stepped position), housing apertures 308, the annular space 258 between the spacer tube 256 and the main telescoping tube 254, the interior volume 278 of the spacer tube 256 and the sink aperture 284 in the closed proximal end of the inner base tube 262. This fluid communication is governed by both the stepping valves 218 and the support valve 216; as long as the stepping valves 218 and the support valve 216 are open, fluid communication between the support reservoir 208 and the sink reservoir 206 (FIGS. 3 and 4) is permitted.

As also explained above, the support reservoir 208 is in valve-governed fluid communication with the stepping reservoir 226 via the support valve aperture 310. When the support valve 216 is open, fluid communication from the support reservoir 208 to the stepping reservoir 226 is permitted and when the support valve 216 is closed, fluid communication from the support reservoir 208 to the stepping reservoir 226 is obstructed.

As further explained above, the stepping reservoir 226 is in valve-governed fluid communication with the sink reservoir 206 via the actuator inlets 322, actuator fluid conduit 320, stepping valves 218, intermediate reservoir 306, piston apertures 309 (when the stepping piston 214 is in the stepped position), housing apertures 308, the annular space 258 between the spacer tube 256 and the main telescoping tube 254, the interior volume 278 of the spacer tube 256 and the sink aperture 284 in the closed proximal end of the inner base tube 262. This fluid communication is governed by the stepping valves 218; when the stepping valves 218 are open, fluid communication between the stepping reservoir 226 and the sink reservoir 206 (FIGS. 3 and 4) is permitted.

Operation of the telescopic position adjustment mechanism 200 as a whole will now be described.

FIGS. 7B and 7C show the stepping valves 218 and the support valve 216 in the locking configuration, in which the support valve 216 is closed while the stepping valves 218 are open. The support valve 216 being closed obstructs fluid communication between the support reservoir 208 and the sink reservoir 206 and also between the support reservoir 208 and the stepping reservoir 226 so that the telescoping element 204 remains supported against the base 202 by the fluid in the support reservoir 208. Because the stepping valves 218 are open, fluid communication between the stepping reservoir 226 and the sink reservoir 206 is permitted. This enables fluid that is in the stepping reservoir 226, such as from a previous stepping cycle, to escape from the stepping reservoir 226 to the sink reservoir 206 under urging from the stepping piston 214, which is urged into the unstepped position by the spring 360.

FIGS. 8B and 8C show the stepping valves 218 and support valve 216 moving from the locking configuration shown in FIGS. 7B and 7C to the stepping configuration shown in FIGS. 9B, 9C, 10B and 10C. As explained above in reference to FIG. 8C, when the valve actuator 250 drives the stepping valves 218 and support valve 216 from the locking configuration to the stepping configuration, the valve actuator 250 drives the stepping valves 218 closed before driving the support valve 216 open. As such, fluid communication between the stepping reservoir 226 and the sink reservoir 206 is obstructed before fluid communication between the support reservoir 208 and the stepping reservoir 226 is permitted.

FIGS. 9B, 9C, 10B and 10C show the stepping valves 218 and support valve 216 in the stepping configuration. In the stepping configuration, the stepping valves 218 are closed and the support valve 216 is open. Thus, fluid communication between the support reservoir 208 and the stepping reservoir 226 is permitted via the support valve aperture 310, while fluid communication between the support reservoir 208 and the sink reservoir 206, and between the stepping reservoir 226 and the sink reservoir 206 (FIGS. 3 and 4), is obstructed by the closed stepping valves 218.

With the support valve 216 open and the stepping valves 218 closed, as long as a sufficient force is applied to the telescoping element 204 to overcome the counterpressure applied by the counterpressure chamber 270, fluid will be forced from the support reservoir 208 into the stepping reservoir 226. The fluid entering the stepping reservoir 226 from the support reservoir 208 through the support valve aperture 310 has no escape path, and begins to push the stepping piston 214 away from the support reservoir 208, thereby moving the stepping piston 214 from the unstepped position shown in FIG. 9B to the stepped position shown in FIG. 10B. Thus, the volume of fluid in the support reservoir 208 decreases by an amount equal to the maximum volume of the stepping reservoir 226, enabling the telescoping element 204 to telescopically collapse toward the base 202 by a fixed distance corresponding to that volume. For example, where the telescopic position adjustment mechanism 200 is used to support a bicycle seat, a user could use the stepping configuration to index the telescoping element, and hence the seat, downward by a fixed distance while sitting on the seat.

If the valve actuator 250 is moved from the stepping position back to the locking position (FIGS. 7B and 7C), the support valve valving element 312 again closes the support valve aperture 310 and obstructs fluid communication between the support reservoir 208 and the stepping reservoir 226. Meanwhile, since in the locking configuration the stepping valves 218 are open, the fluid in the stepping reservoir 226 can escape, under urging from the stepping piston 214 as it is pushed to the unstepped position by the spring 360, to the sink reservoir 206. This escape path includes the actuator inlets 322, actuator fluid conduit 320, stepping valves 218, intermediate reservoir 306, piston apertures 309, housing apertures 308, the annular space 258 between the spacer tube 256 and the main telescoping tube 254, the interior volume 278 of the spacer tube 256 and the sink aperture 284 in the closed proximal end of the inner base tube 262. The stepping valves 218 and support valve 216 can then be again moved to the stepping configuration to further index the telescoping element 204 toward the base 202 by the same fixed distance.

If the valve actuator 250 is moved into the free movement position (FIGS. 11B and 11C) from the stepping configuration, the stepping valves 218 and support valve 216 will be in the free movement configuration, that is, the stepping valves 218 and support valve 216 are open. In the free movement configuration, fluid can flow freely between the support reservoir 208 and the sink reservoir 206 via the support valve aperture 310, actuator inlets 322, actuator fluid conduit 320, stepping valves 218, intermediate reservoir 306, housing apertures 308, the annular space 258 between the spacer tube 256 and the main telescoping tube 254, the interior volume 278 of the spacer tube 256 and the sink aperture 284 in the closed proximal end of the inner base tube 262. Thus, the incompressible fluid can bypass the stepping reservoir 226 and flow from the support reservoir 208 to the sink reservoir 206, enabling free telescopic movement of the telescoping element 204 relative to the base 202. Where the force applied to the telescoping element 204 exceeds the force applied by the counterpressure chamber 270, fluid will be forced into the sink reservoir 206 and the telescoping element 204 will telescopically collapse relative to the base 202. Where the force applied by the counterpressure chamber 270 exceeds the force applied to the telescoping element 204, the floating piston 268 will force fluid from the sink reservoir 206 into the support reservoir and the telescoping element will telescopically extend relative to the base 202. For example, where the telescopic position adjustment mechanism 200 is used to support a bicycle seat, the counterpressure could be chosen so that, with the support valve 216 and stepping valves 218 in the free movement configuration, a rider could force the seat downward by sitting on it or allow it to rise by standing on the pedals.

Figure 12:
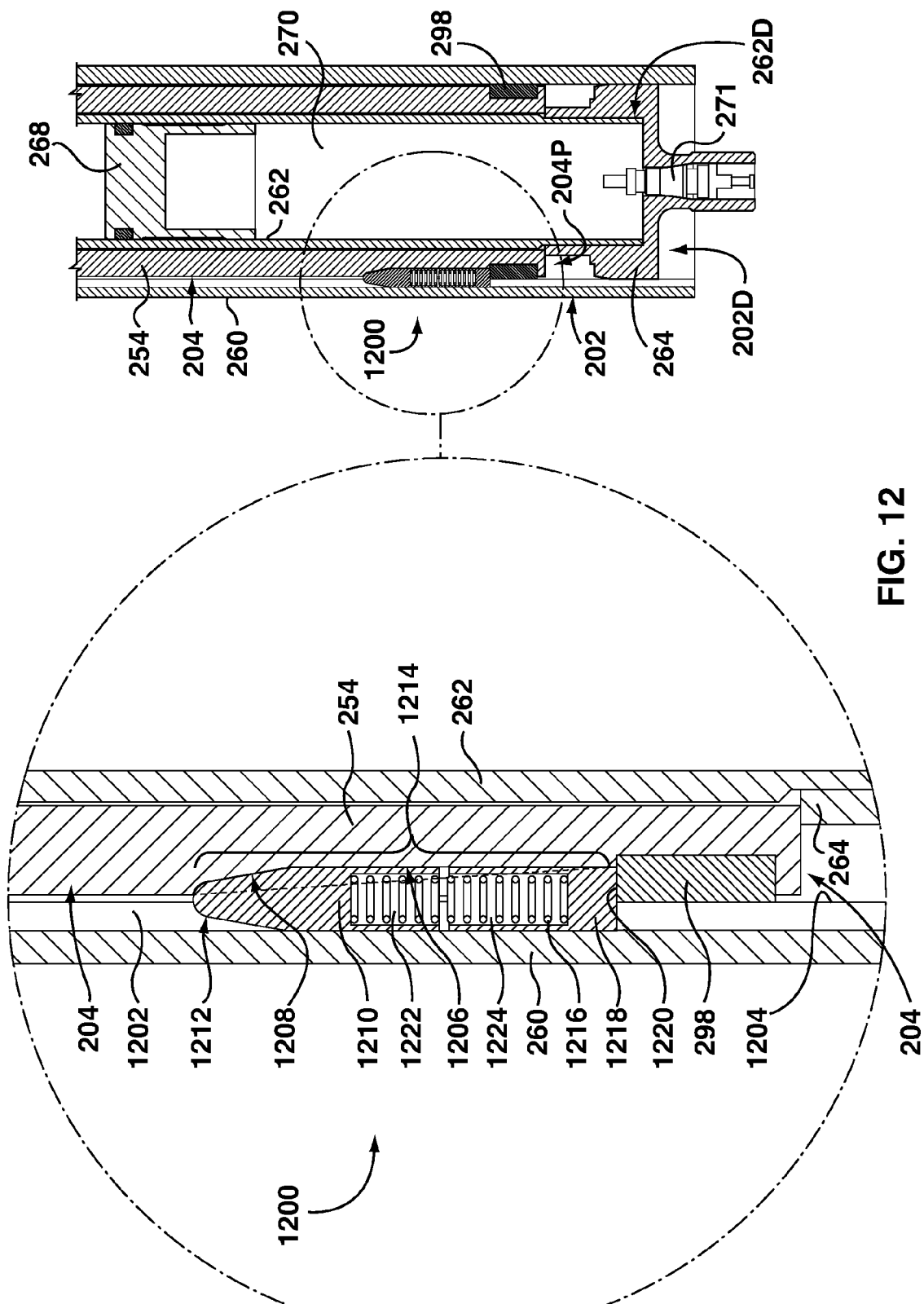
FIG. 12 is a cross-sectional view of a portion of the telescopic position adjustment mechanism of FIG. 2A showing a rotation-resistance mechanism thereof, taken along the line 12-12 in FIG. 4; and, FIGS. 13A through 13F show exemplary shapes for a locking pin for a rotation-resistance mechanism of the type shown in FIG. 12.

Reference is now made to FIG. 12, which shows an exemplary rotation-resisting mechanism 1200 that preferably forms part of the telescopic position adjustment mechanism 200 to provide a rotation-resistant telescoping arrangement.

As noted above, the base 202 includes an outer base tube 260, and the telescoping element 204 is slidably received in the outer base tube 260 to telescope relative to the outer base tube 260 by a telescopic travel length. In the exemplary illustrated embodiment, the outer base tube 260 has a channel 1202 formed in its inner surface 1204 extending parallel to the direction of telescoping movement of the telescoping element 204 relative to the outer base tube 260 and the telescoping element 204 has a receptacle 1206 formed in its outer surface. The channel 1202 and the receptacle 1206 are arranged in facing registration with one another to form a receptacle-channel pair. In other embodiments, the channel could be formed in the outer surface of the telescoping element and the receptacle could be formed in the inner surface of the outer tube.

The receptacle 1206 includes a locking ramp 1208 that tapers toward the corresponding channel 1202, and a locking key 1210 is captured between the receptacle 1206 and the channel 1202. The locking key 1210 has a shape complementary to the shape of the locking ramp 1208 and complementary to the channel 1202. In the illustrated embodiment, as shown in FIGS. 12 and 13A, the locking key 1210 is generally cylindrical and has a positive rounded conical shape at a locking end 1212 thereof received by the locking ramp 1208, which has a negative rounded conical shape. The ramp need not be the precise negative shape of the locking end of the locking key. For example, a ramp used with the locking key 1210 may be a V-shaped groove of decreasing depth. The channel 1202 has a negative half-cylindrical shape, to which the generally cylindrical portion of the locking key 1210 is complementary.

In the illustrated embodiment, the locking key 1210 forms part of a locking pin 1214 captured between the receptacle 1206 and the channel 1202. The locking pin 1214 also includes a biasing member in the form of a spring 1216 and a cylindrical support member 1218 that engages a shoulder 1220 on the telescoping element 204. In the illustrated embodiment, the shoulder is formed by the second annular guide bushing 298 adjacent the proximal end 204P of the telescoping element 204; the shoulder may also be formed on the main telescoping tube 254. The spring 1216 is received in a first spring bore 1222 in the locking key and in a second spring bore 1224 in the support member 1218, and acts between the support member 1218 and the locking key 1210. Since the support member 1218 engages the shoulder 1220 on the telescoping element 204, the spring acts between the telescoping element 204 and the locking key 1210 to urge the locking key 1210 along the tapered locking ramp 1208 and into engagement with the channel 1202. The channel 1202 is longer than the locking pin 1214, and hence longer than the locking key 1210, to permit telescopic travel of the telescoping element 204 relative to the base 202.

When the telescoping element 204 is static relative to the base 202, i.e. when the valve mechanism 213 is in the locking configuration, as the spring 1216 urges the locking key 1210 along the locking ramp 1208, the locking ramp 1208 guides the locking end 1212 of the locking key 1210 toward the channel 1202 to maintain a tight engagement between the locking key 1210 and the channel 1202. This tight engagement between the locking key 1210 and the channel 1202 limits play between the locking key 1210 and the channel 1202 and, since the locking key 1210 is also securely received in the receptacle 1208, resists rotation of the telescoping element 204 relative to the base 202. When the telescoping element 204 is telescoping relative to the base 202, i.e. when the valve mechanism 213 is in the stepping configuration or the free movement configuration, friction between the locking key 1210 and the channel 1202 can be relieved by compression of the spring 1216.

The locking pin 1214 shown in FIGS. 12 and 13A is exemplary only, and other suitable shapes may be used so long as the channel, receptacle and locking ramp are of complementary shape. FIGS. 13B through 13F show exemplary alternative locking pins 1214B to 1214F, respectively. In addition, in alternate embodiments the support member may be omitted, and the biasing member may act directly between the locking key and the telescoping element 204. In such an embodiment, a ball bearing may serve as a locking key.

Moreover, the rotation-resisting mechanism 1200 described above is not limited to the exemplary telescopic position adjustment mechanism 200 described above, but may be used in any suitable telescoping arrangement.

Although the telescopic position adjustment mechanisms and rotation-resisting mechanisms described herein are well suited to use with a bicycle seat, they are of course not limited to such applications.

One or more currently preferred embodiments have been described by way of example. It will be apparent to persons skilled in the art that a number of variations and modifications can be made without departing from the scope of the claims.

What is claimed is:

1. A telescopic position adjustment mechanism, comprising:
 a base;

a telescoping element slidingly telescopically received by the base;
a sink reservoir;
a support reservoir defined between the base and the telescoping element;
the support reservoir supporting the telescoping element against the base;
the support reservoir having a variable volume according to a position of the telescoping element relative to the base;
a housing defining a stepping chamber;
a stepping piston slidingly sealingly received in the stepping chamber;
the stepping piston reciprocable within the stepping chamber between a stepped position and an unstepped position;
the stepping piston being biased toward the unstepped position;
the stepping piston cooperating with the stepping chamber to define a variable-volume stepping reservoir whose maximum volume is defined by the stepped position of the stepping piston and whose minimum volume is defined by the unstepped position of the stepping piston;
the support reservoir being in valve-governed fluid communication with the sink reservoir;
the stepping reservoir being in valve-governed fluid communication with the support reservoir;
the stepping reservoir being in valve-governed fluid communication with the sink reservoir;
at least one valve governing fluid communication between:
the stepping reservoir and the sink reservoir; and
the stepping reservoir and the support reservoir;
the at least one valve having:
a locking configuration in which:
fluid communication between the support reservoir and the stepping reservoir is obstructed;
fluid communication between the support reservoir and the sink reservoir is obstructed; and
fluid communication between the stepping reservoir and the sink reservoir is permitted;
a stepping configuration in which:
fluid communication between the support reservoir and the stepping reservoir is permitted;
fluid communication between the support reservoir and the sink reservoir is obstructed;
fluid communication between the stepping reservoir and the sink reservoir is obstructed; and
at least one valve actuator coupled to the at least one valve for selectively driving the at least one valve into one of the locking configuration and the stepping configuration.

2. The telescopic position adjustment mechanism of claim 1, wherein when the at least one valve actuator drives the at least one valve from the locking configuration to the stepping configuration, fluid communication between the stepping reservoir and the sink reservoir is obstructed before fluid communication between the support reservoir and the stepping reservoir is permitted.

3. The telescopic position adjustment mechanism of claim 2, wherein:
the at least one valve further has a free movement configuration in which fluid communication between the support reservoir and the sink reservoir is permitted; and
the at least one valve actuator is coupled to the at least one valve for selectively driving the at least one valve into the free movement configuration.

4. The telescopic position adjustment mechanism of claim 3, wherein:
the at least one valve actuator comprises a single valve actuator driving the at least one valve;
the valve actuator slidably received in the housing;
the valve actuator being slidably movable relative to the housing to reciprocate through a stepping position between a locking position and a free movement position;
the valve actuator moving independently of the stepping piston;
the valve actuator driving the at least one valve to reciprocate through the stepping configuration between the locking configuration and the free movement configuration;
wherein:
when the valve actuator is in the locking position the at least one valve is in the locking configuration;
when the valve actuator is in the stepping position the at least one valve is in the stepping configuration; and
when the valve actuator is in the free movement position the at least one valve is in the free movement configuration.

5. The telescopic position adjustment mechanism of claim 4, wherein the at least one valve comprises:
at least one stepping valve interposed in a fluid path between the stepping reservoir and the sink reservoir to govern fluid communication therebetween; and
at least one support valve interposed in a fluid path between the support reservoir and the stepping reservoir to govern fluid communication therebetween;
and wherein:
when the at least one valve is in the locking configuration, the at least one support valve is closed;
when the at least one valve is in the stepping configuration, the at least one support valve is open and the at least one stepping valve is closed; and
when the at least one valve is in the free movement configuration, the at least one support valve is open and the at least one stepping valve is open.

6. The telescopic position adjustment mechanism of claim 5, wherein:
the stepping piston cooperates with the stepping chamber to define a variable-volume intermediate reservoir opposite the stepping reservoir;
the stepping piston divides the stepping chamber into the stepping reservoir and the intermediate reservoir;
the maximum volume of the intermediate reservoir is defined by the unstepped position of the stepping piston and the minimum volume of the intermediate reservoir is defined by the stepped position of the stepping piston;
the intermediate reservoir is in fluid communication with the sink reservoir;
the stepping reservoir is in valve-governed fluid communication with the sink reservoir through the intermediate reservoir; and
the at least one stepping valve is interposed in a fluid path between the stepping reservoir and the intermediate reservoir to govern fluid communication therebetween.

7. The telescopic position adjustment mechanism of claim 6, wherein:
the at least one valve actuator comprises a single valve actuator;

the valve actuator being slidably received in the housing;
the valve actuator being slidably movable relative to the housing to reciprocate through a stepping position between a locking position and a free movement position;
the valve actuator moving independently of the stepping piston;
and wherein:
when the valve actuator is in the locking position, the at least one support valve is closed;
when the valve actuator is in the stepping position, the at least one support valve is open and the at least one stepping valve is closed; and
when the valve actuator is in the free movement position, the at least one support valve is open and the at least one stepping valve is open.

8. The telescopic position adjustment mechanism of claim 7, wherein when the valve actuator moves from the locking position to the stepping position, the valve actuator drives the stepping valve closed before driving the support valve open.

9. The telescopic position adjustment mechanism of claim 8, wherein:
the valve actuator comprises a stepping valve actuator portion and a support valve actuator portion;
the support valve actuator portion slidingly telescopically received by the stepping valve actuator portion; and
movement of the valve actuator from the locking position to the stepping position comprises:
a stepping valve driving stage in which the stepping valve actuator portion slides relative to the housing while also sliding telescopically along the support valve actuator portion to drive the at least one stepping valve open while the support valve actuator portion remains static relative to the housing and the support valve remains closed; followed by
a support valve driving stage in which the stepping valve actuator portion slides relative to the housing and moves the support valve actuator portion linearly relative to the housing to drive the at least one support valve open.

10. The telescopic position adjustment mechanism of claim 9, wherein the at least one support valve comprises:
a support valve aperture in the housing between the support reservoir and the stepping reservoir; and
a support valve valving element carried by the support valve actuator portion for movement into and out of sealing engagement with the support valve aperture.

11. The telescopic position adjustment mechanism of claim 10, wherein:
the stepping reservoir is in valve-governed fluid communication with the intermediate reservoir through an actuator fluid conduit defined in the valve actuator; and
the at least one stepping valve is interposed between the actuator fluid conduit and the intermediate reservoir.

12. The telescopic position adjustment mechanism of claim 11, wherein each stepping valve comprises:
a stepping valve passage in the stepping valve actuator portion connecting the actuator fluid conduit in fluid communication with the intermediate reservoir;
the stepping valve passage having an inwardly projecting annular shoulder;
a stepping valve valving element carried by the stepping valve actuator portion;
the stepping valve valving element having a tapered end;
the stepping valve valving element being movable relative to the stepping valve passage for movement of the tapered end into and out of sealing engagement with the annular shoulder;
at least one biasing member acting between the stepping valve actuator portion and the stepping valve valving element to bias the stepping valve valving element into engagement with the annular shoulder;
a cam surface on an interior surface of the housing opposite the stepping valve passage; the cam surface comprising:
a first cam surface portion;
a second cam surface portion; and
a ball receptacle defined between the first cam surface portion and the second cam surface portion;
the first cam surface portion and the second cam surface portion each extend further inwardly than the ball receptacle so that the ball receptacle forms a trough between the first cam surface portion and the second cam surface portion;
the cam surface tapering outwardly from the first cam surface portion toward the ball receptacle and tapering inwardly from the ball receptacle to the second cam surface portion; and
a ball captured between the cam surface and the tapered end of the stepping valve valving element;
the ball being carried along the cam surface by the stepping valve actuator portion during movement thereof;
wherein:
when the valve actuator is in the locking position, the first cam surface portion forces the ball against the tapered end of the stepping valve valving element to disengage the tapered end of the stepping valve valving element from the annular shoulder and permit fluid flow past the annular shoulder;
when the valve actuator is in the stepping position, the ball rests in the ball receptacle and the tapered end of the stepping valve valving element is in sealing engagement with the annular shoulder; and
when the valve actuator is in the free movement position, the second cam surface portion forces the ball against the tapered end of the stepping valve valving element to disengage the tapered end of the stepping valve valving element from the annular shoulder and permit fluid flow past the annular shoulder.

13. The telescopic position adjustment mechanism of claim 12, wherein:
the housing is received in a distal end of the telescoping element, relative to the base;
the telescoping element comprises a main telescoping tube and a spacer tube disposed inside the main telescoping tube;
the spacer tube is fixedly carried by the housing and extends from the housing along a portion of the main telescoping tube toward a proximal end of the telescoping element;
an exterior surface of the spacer tube is spaced from an interior surface of the main telescoping tube to define an annular space between the spacer tube and the main telescoping tube;
the intermediate reservoir is in fluid communication with the annular space between the spacer tube and the main telescoping tube;
the spacer tube has a distal end, relative to the base, that is sealed to the housing;

the base comprises an outer base tube and an inner base tube disposed inside the outer base tube;

the inner base tube is rigidly coupled to the outer base tube and extends along a portion of the outer base tube toward a proximal end of the base, relative to the telescoping element;

an exterior surface of the inner base tube is spaced from an interior surface of the outer base tube to define an annular space between the inner base tube and the outer base tube;

the main telescoping tube is received in the annular space between the inner base tube and the outer base tube;

the inner base tube has closed proximal and distal ends, relative to the telescoping element;

a floating piston is slidingly sealingly received in the inner base tube;

the floating piston divides an interior volume of the inner base tube into the sink reservoir, disposed between the floating piston and the closed proximal end of the inner base tube, and a counterpressure chamber disposed between the floating piston and the closed distal end of the inner base tube, each of the sink reservoir and the counterpressure chamber being of variable volume according to the position of the floating piston;

a fixed piston tube is in sealing engagement with the closed proximal end of the inner base tube and extends from the closed proximal end of the inner base tube toward the proximal end of the base, terminating at a fixed piston that is slidingly sealingly received in the spacer tube;

the housing, spacer tube, and fixed piston cooperate to define the support reservoir;

an annular guide is sealingly fixed inside the main telescoping tube so as to be positioned between the proximal end of the spacer tube and the closed proximal end of the inner base tube;

the annular guide slidingly sealingly receives the fixed piston tube;

the annular space between the spacer tube and the main telescoping tube is in fluid communication with an interior volume of the spacer tube between the annular guide and the fixed piston;

a piston tube fluid conduit is defined in the fixed piston tube;

the interior volume of the spacer tube between the annular guide and the fixed piston is in fluid communication with the piston tube fluid conduit; and the piston tube fluid conduit is in fluid communication with the sink reservoir through a sink aperture in the closed proximal end of the inner base tube.

14. The telescopic position adjustment mechanism of claim 13, wherein the counterpressure chamber is a counterpressure reservoir for containing compressible gas.

15. The telescopic position adjustment mechanism of claim 14, further comprising a counterpressure valve in fluid communication with the counterpressure reservoir for introducing compressible gas into, and releasing compressible gas from, the counterpressure reservoir.

16. The telescopic position adjustment mechanism of claim 15, further comprising a driver pivotally carried by the telescoping element for driving the valve actuator from the locking position through the stepping position to the free movement position.

17. The telescopic position adjustment mechanism of claim 13, wherein:

a biasing member acts between the stepping valve actuator portion and the stepping piston;

the biasing member urges the stepping piston toward the unstepped position;

in the unstepped position the stepping piston engages a stop on the housing so that, when the stepping piston is in the unstepped position, the biasing member acts between the housing and the valve actuator to urge the valve actuator toward the locking position.

18. The telescopic position adjustment mechanism of claim 17, wherein:

when the stepping piston is in the unstepped position, the biasing member acts between the housing and the stepping valve actuator portion; and the stepping valve actuator portion carries the support valve actuator portion when the valve actuator moves to the locking position under urging from the biasing member.

19. The telescopic position adjustment mechanism of claim 1, further comprising a saddle clamp carried by the telescoping element at a distal end thereof for removably receiving a bicycle saddle.

\* \* \* \* \*